(12) United States Patent
Ohta

(10) Patent No.: US 7,834,848 B2
(45) Date of Patent: Nov. 16, 2010

(54) COORDINATE CALCULATING APPARATUS AND COORDINATE CALCULATING PROGRAM

(75) Inventor: Keizo Ohta, Kyoto (JP)

(73) Assignee: Nintendo Co., Ltd, Kyoto (JP)

( * ) Notice: Subject to any disclaimer, the term of this patent is extended or adjusted under 35 U.S.C. 154(b) by 1167 days.

(21) Appl. No.: 11/405,664

(22) Filed: Apr. 18, 2006

(65) Prior Publication Data

US 2007/0211026 A1 Sep. 13, 2007

(30) Foreign Application Priority Data

Mar. 9, 2006 (JP) ............... 2006-064437

(51) Int. Cl.
G06F 3/033 (2006.01)
G09G 5/08 (2006.01)

(52) U.S. Cl. .................. 345/157; 345/158; 463/37

(58) Field of Classification Search ......... 345/156–158; 463/36–39
See application file for complete search history.

(56) References Cited

U.S. PATENT DOCUMENTS

| | | | |
|---|---|---|---|
| 5,309,137 A | 5/1994 | Kajiwara | |
| 5,319,387 A | 6/1994 | Yoshikawa | |
| 5,574,479 A | 11/1996 | Odell | |
| 5,627,565 A | 5/1997 | Morishita et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 7,545,956 B2 | 6/2009 | Miyahara | |
| 7,672,543 B2 | 3/2010 | Hull et al. | |
| 2003/0071858 A1* | 4/2003 | Morohoshi | 345/856 |
| 2004/0174340 A1 | 9/2004 | Bruneau et al. | |
| 2005/0052415 A1 | 3/2005 | Braun et al. | |
| 2005/0137774 A1 | 6/2005 | Rupp | |
| 2005/0244034 A1 | 11/2005 | Miyahara | |
| 2007/0211027 A1 | 9/2007 | Ohta | |

FOREIGN PATENT DOCUMENTS

| | | |
|---|---|---|
| JP | 8-335136 | 12/1996 |
| JP | 11-305935 A | 5/1999 |

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner*—Kevin M Nguyen
(74) *Attorney, Agent, or Firm*—Nixon & Vanderhye P.C.

(57) ABSTRACT

A coordinate calculating apparatus detects a coordinate point (detected coordinate point) of an area satisfying a predetermined condition in a captured image for each area. Next, a vector (assumed vector) indicating a relative positional relationship between two position coordinate points in the captured image is set. The coordinate calculating apparatus determines one of the position coordinate points detected by coordinate detecting means, as one of object position coordinate points, and determines the other object position coordinate point using the one position coordinate point and the vector.

22 Claims, 25 Drawing Sheets

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intellignet Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

Keizo Ohta, U.S. Appl. No. 11/545,444, Office Action mailed May 26, 2010 (12 pages).

* cited by examiner

COORDINATE CALCULATING APPARATUS AND COORDINATE CALCULATING PROGRAM

CROSS REFERENCE OF RELATED APPLICATION

The disclosure of Japanese Patent Application No. 2006-064437 is incorporated herein by reference.

BACKGROUND OF THE INVENTION

1. Field of the Invention

The present invention relates to a coordinate calculating apparatus and a coordinate calculating program. More particularly, the present invention relates to a coordinate calculating apparatus and a coordinate calculating program for calculating coordinates by capturing predetermined markers using image capturing means.

2. Description of the Background Art

Patent Document 1 (Japanese Patent Laid-Open Publication No. 8-335136) discloses a pointing device comprising image capturing means. This pointing device is used so as to designate an arbitrary position on a display screen. The pointing device detects two markers in an image captured by the image capturing means, and calculates positions of the markers in the image. Thereafter, a position on the display screen which is designated by the pointing device (designated position) is calculated from the positions of the markers. Patent Document 1 also describes that, when makers having two colors (red and green) are used, the colors of the markers are not displayed on the display screen (paragraph 0029), and when the two markers are not detected in a captured image, an error process is performed (paragraph 0042).

In the pointing device of Patent Document 1, when the two markers are not correctly detected, i.e., an image of at least one of the marker is no longer captured, an error process is performed. In other words, only when the two markers are included in the captured image, the pointing device can be operated. Therefore, when one of the markers is not detected, the pointing device cannot be operated even if the other marker is detected. Therefore, the possibility that the pointing device cannot be operated is high.

In addition, a range in which the user can move the pointing device is limited to a range in which images of the two markers are captured, so that the pointing device can be moved only in a narrow range, likely leading to the difficulty for the user to use. Particularly, when a distance between the two markers is large or when a distance between the pointing device and the markers is close, an image of at least one of the markers is located close to an edge of the captured image. In this case, by moving the pointing device by only a short distance, one of the markers disappears from the captured image, so that an error process is performed.

SUMMARY OF THE INVENTION

Therefore, an object of the present invention is to provide a coordinate calculating apparatus and a coordinate calculating program in which an operation allowable range is large so that an operation is unlikely to be impossible.

The present invention has the following features to attain the object mentioned above. Note that, in this section, reference numerals, supplemental descriptions, and the like in parentheses indicate correspondence with embodiments described below so as to assist understanding of the present invention, but do not limit the present invention.

A first aspect of the present invention is directed to a coordinate calculating apparatus (a game apparatus 3 and a controller 7) for calculating two object position coordinate points (marker coordinate points) from an image captured by an image capturing apparatus (an image capturing element 40), the two object position coordinate points indicating positions of two predetermined objects (markers 8a and 8b) whose images to be captured, the positions being on a plane (a coordinate plane illustrated in FIG. 9) corresponding to the captured image. The coordinate calculating apparatus comprises coordinate detecting means (an image processing circuit 41), vector setting means (steps S63 and S64, or a CPU 10 executing step S92 or S93, etc.; hereinafter only step numbers are described), and coordinate determining means (S62, S66, and S67, or S96 and S98). The coordinate detecting means detects a position coordinate point (detected coordinate point) of an area satisfying a predetermined condition in the captured image for each area. The vector setting means sets a vector (assumed vector) indicating a relative positional relationship between two position coordinate points in the captured image. The coordinate determining means determines one of the detected position coordinate points detected by the coordinate detecting means as one of the object position coordinate points, and determining the other object position coordinate point using the one of the detected position coordinate points and the vector.

In a second aspect, the vector setting means may includes direction setting means (S63) of setting a direction of the vector based on a tilt determined by tilt determining means for a tilt of the image capturing apparatus, and length setting means (S64) of setting a length of the vector to be a predetermined length.

In a third aspect, the coordinate calculating apparatus may further comprise object position storing means (a main memory 13) of storing object position coordinate data (marker coordinate data 534a and 534b) indicating at least one of a set of the two object position coordinate points determined by the coordinate determining means, and a vector connecting the two object position coordinate points, every time determination is performed by the coordinate determining means. In this case, the length setting means sets the length of the vector to be a length connecting between the two object position coordinate points indicated by object position coordinate data most recently stored.

In a fourth aspect, the direction setting means may set the direction of the vector based on a correspondence relationship between a tilt determined by the tilt determining means in a situation that the image capturing apparatus is at a predetermined tilt, and a direction connecting the two object position coordinate points detected from an image captured by the image capturing apparatus in the situation.

In a fifth aspect, the tilt determining means includes an acceleration sensor (37) which is fixedly provided to a housing used in common with the image capturing apparatus and detects accelerations in two axial directions perpendicular to an image capturing direction of the image capturing apparatus. In this case, the vector setting means calculates the vector based on the acceleration in the axial directions detected by the acceleration sensor.

In a sixth aspect, the coordinate calculating apparatus may further comprise object position storing means (the main memory 13) of storing object position coordinate data (the marker coordinate data 534a and 534b) indicating at least one of a set of the two object position coordinate points determined by the coordinate determining means, and a vector connecting the two object position coordinate points, every time determination is performed by the coordinate determining means. In this case, the vector setting means calculates or obtains a vector (the previous vector) connecting between the two object position coordinate points indicated by object position coordinate data most recently stored.

In a seventh aspect, the coordinate determining means may include first determination means (S62) of determining which of a first object position coordinate point and a second object position coordinate point of the two object position coordinate points one of the position coordinate points detected by the coordinate detecting means is, and second determination means (S66 and S67) of determining the second object position coordinate point by adding the vector to the first object position coordinate point when the first object position coordinate point is determined by the first determination means, and the first object position coordinate point by subtracting the vector from the second object position coordinate point when the second object position coordinate point is determined by the first determination means.

In an eighth aspect, the coordinate calculating apparatus may further comprise object position storing means (the main memory 13) of storing object position coordinate data (the marker coordinate data 534a and 534b) including the two object position coordinate points determined by the coordinate determining means, every time determination is performed in the coordinate determining means. In this case, the first determination means calculates a distance between each of the position coordinate points detected by the coordinate detecting means and each of a first object position coordinate point and a second object position coordinate point indicated by object position coordinate data most recently stored, and determines one of the position coordinate points detected by the coordinate detecting means, as a first object position coordinate point, when a distance between the one detected position coordinate point and the first object position coordinate point indicated by the object position coordinate data most recently stored is shortest, and one of the position coordinate points detected by the coordinate detecting means, as a second object position coordinate point, when a distance between the one detected position coordinate point and the second object position coordinate point indicated by the object position coordinate data most recently stored is shortest.

In a ninth aspect, the coordinate determining means includes temporary coordinate calculating means (S94) and determination executing means (S96 and S97). The temporary coordinate calculating means determines one of the position coordinate points detected by the coordinate detecting means, as a determined coordinate point, adds the vector to the determined coordinate point to obtain a first temporary coordinate point, and subtracts the vector from the determined coordinate point to obtain a second temporary coordinate point. The determination executing means determines the first temporary coordinate point and the determined coordinate point as the two object position coordinate points when only the first temporary coordinate point of the two temporary coordinate points is outside an area of a captured image, and the second temporary coordinate point and the determined coordinate point as the two object position coordinate points when only the second temporary coordinate point of the two temporary coordinate points is outside an area of a captured image.

In a tenth aspect, the coordinate calculating apparatus may further comprise object position coordinate calculating means (S12 or S17) of, when the number of position coordinate points detected by the coordinate detecting means is two or more, calculating the two object position coordinate points using the position coordinate points. In this case, the coordinate determining means determines the two object position coordinate points when calculation of the two object position coordinate points by the object position coordinate calculating means is not possible.

An eleventh aspect is directed to a coordinate calculating apparatus for calculating two object position coordinate points from an image captured by an image capturing apparatus, the two object position coordinate points indicating positions of two predetermined objects whose images to be captured, the positions being on a plane corresponding to the captured image. The apparatus comprises coordinate detecting means (the image processing circuit 41), reference setting means (S35 or S75), selection means (S41 or S81), determination means (S13, S18, and S64, or S92 and S93), output means (S41 or S81), vector setting means (S63 and S64, or S92 and S93), and coordinate determining means (S62, S66, and S67, or S96 and S98). The coordinate detecting means detects a position coordinate point of an area satisfying a predetermined condition in the captured image for each area. The reference setting means sets a reference with respect to at least one of a direction connecting two position coordinate points in the captured image and a length between the two position coordinate points, when a plurality of position coordinate points detected by the coordinate detecting means. The selection means selects a combination of two position coordinate points most close to the reference set by the reference setting means, from combinations of two position coordinate points among the plurality of position coordinate points. The determination means determines whether or not two position coordinate points have been selected by the selection means. The output means outputs the two position coordinate points selected by the selection means, as the two object position coordinate points, when a result of the determination by the determination means is positive. The vector setting means sets a vector indicating a relative positional relationship between two position coordinate points in the captured image, when the result of the determination by the determination means is negative. The coordinate determining means determines one of the position coordinate points determined by the coordinate determining means as one of the object position coordinate points, and determines the other object position coordinate point using the one of the detected position coordinate points and the vector, when the result of the determination by the determination means is negative.

Note that the present invention may be provided in the form of a coordinate calculating program which is executed by a computer of a coordinate calculating apparatus.

According to the first aspect, by using a vector set by the vector setting means, the other object position coordinate point can be calculated from a detected position coordinate point. Therefore, even when only one position coordinate point is detected, the other coordinate point is estimated using the vector, thereby making it possible to determine two object position coordinate point.

According to the second aspect, the tilt determining means is used to determine a tilt of the image capturing apparatus, and a vector indicating a direction corresponding to the tilt is set, thereby making it possible to determine two object position coordinate points, taking into consideration the tilt of the image capturing apparatus. A direction connecting the two object position coordinate points corresponds to the tilt of the image capturing apparatus. Therefore, by determining two object position coordinate points while taking into consideration the tilt of the image capturing apparatus, the two object position coordinate points can be correctly determined.

According to the third aspect, the length of the vector is set so that the length is a length between the object position coordinate points, using previous object position coordinate data. Here, when the selection process is executed at a frequency of several ten times or several hundred times per second, it can be assumed that the amount of a change from a previous object position coordinate point to a current object position coordinate point is not large. Therefore, by setting the length of the vector to be the length between the object position coordinate points, the two object position coordinate points can be correctly selected.

According to the fourth aspect, the direction and length of the vector is set so that the length is a length between the object position coordinate points, using previous object position coordinate data. As described above, when the selection process is executed at a frequency of several ten times or several hundred times per second, it can be assumed that the amount of a change from a previous object position coordinate point to a current object position coordinate point is not large. Therefore, by setting the vector using the previous object position coordinate data, the two object position coordinate points can be correctly selected.

According to the fifth aspect, the first vector is calculated based on a correspondence relationship between the tilt of the image capturing apparatus and the direction connecting the object position coordinate points, thereby making it possible to correctly calculating the first vector corresponding to the tilt of the image capturing apparatus.

According to the sixth aspect, by using an acceleration sensor, a tilt of the image capturing apparatus can be easily determined by calculating a tilt angle from the linear acceleration signal output by the acceleration sensor 73 in response to the acceleration of gravity (i.e., 9.8 m/S$^2$).

According to the seventh aspect, by adding or subtracting the vector with respect to a detected position coordinate point, the other object position coordinate point can be correctly calculated.

According to the eighth aspect, one of detected position coordinate points, that is most close to a previous object position coordinate point, is determined as the other object position coordinate point. The determined position coordinate point is determined as a first object position coordinate point or a second object position coordinate point, depending on which of previous object position coordinate points (first and second object position coordinate points) the determined object position coordinate point is closer to. Thereby, according to the eighth aspect, it is possible to correctly determine whether the determined position coordinate point is a first object position coordinate point or a second object position coordinate point. In addition, it is possible to correctly determine whether the vector is added or subtracted in order to calculate the other object position coordinate point.

According to the ninth aspect, by assuming that one of the object position coordinate points which has not been detected is outside the captured image, the other object position coordinate point can be easily determined without using previous object position coordinate data or determining a tilt of the image capturing apparatus.

According to the tenth aspect, when object position coordinate points were not able to be calculated using a method of calculating object position coordinate points using two or more detected position coordinate points, a method of calculating object position coordinate points using one detected position coordinate point is performed. Thereby, the certainty of calculating object position coordinate points can be increased, and the possibility that calculation of object position coordinate points is not possible can be reduced.

According to the eleventh aspect, by using a reference set by the reference setting means, two object position coordinate points can be selected from a plurality of position coordinate points. Therefore, even when three or more position coordinate points are detected by the coordinate detecting means due to an influence of noise, two position coordinate points can be specified among them, and thus, the influence of noise can be removed. Thereby, position coordinate points of objects whose images to be captured can be calculated even in the presence of an influence of noise. In addition, according to the eleventh aspect, the possibility that object position coordinate points obtained by a method of selecting object position coordinate points using a reference are not correct, is determined using a similarity between the object position coordinate points and the reference. When the similarity is larger than a predetermined value, i.e., the possibility is high, one position coordinate point and a vector set by the vector setting means are used to calculate the other object position coordinate point from the position coordinate point. Thereby, it is possible to calculate object position coordinate points even when the number of detected position coordinate points is any value. In addition, by performing earlier the method of selecting object position coordinate points using a reference, the probability that correct object position coordinate points are calculated can be increased, and by performing later the method of using a vector, the possibility that calculation of object position coordinate points is not possible can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
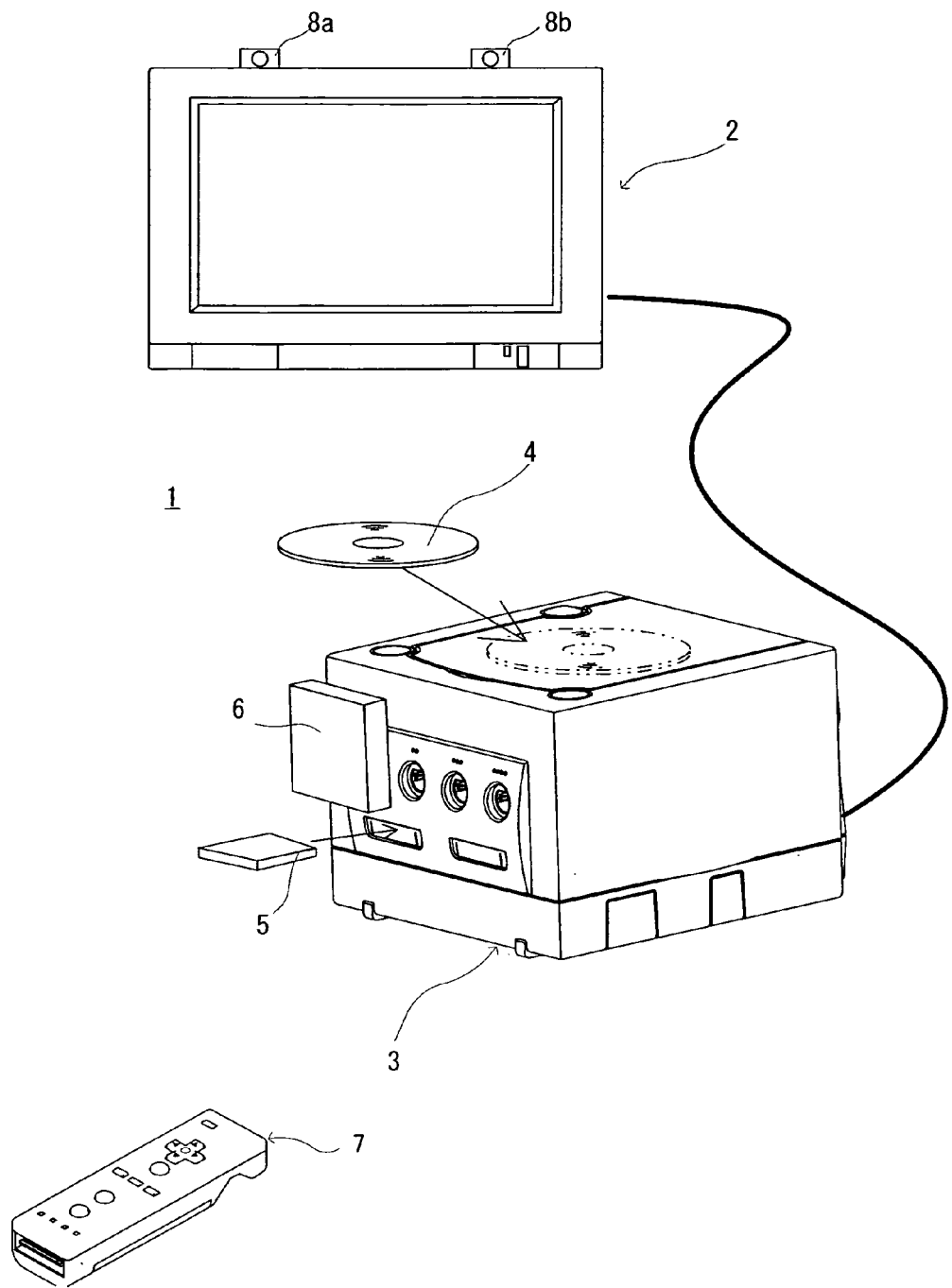
FIG. 1 is a diagram illustrating an external appearance of a game system including a game apparatus which is an example of a coordinate calculating apparatus according to an embodiment of the present invention.

A game system 1 including a game apparatus which is an exemplary coordinate calculating apparatus according to an embodiment of the present invention will be described with reference to FIG. 1. Note that FIG. 1 is a diagram illustrating an external appearance of the game system 1. Hereinafter, a coordinate calculating apparatus of the present invention will be described, illustrating a stationary game apparatus as an example.

In FIG. 1, the game system 1 is composed of a stationary game apparatus (hereinafter simply referred to as a game apparatus) 3 which is connected via a connection code to a display (hereinafter referred to as a monitor) 2 with a loudspeaker, such as a television set for home use or the like, and a controller 7 which inputs operation data to the game apparatus 3. Two markers 8a and 8b are provided in the vicinity of the monitor 2 (e.g., on an upper side of the screen in FIG. 1). Specifically, the markers 8a and 8b are infrared LEDs which output infrared light toward the front of the monitor 2. The game apparatus 3 is connected via a connection terminal to a reception unit 6. The reception unit 6 receives operation data wirelessly transmitted from the controller 7, so that the controller 7 and the game apparatus 3 are connected together via wireless communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using the saved data stored in the external memory card 5, and display a game image on the monitor 2. The player of the game apparatus 3 can enjoy events of the game by operating the controller 7 while watching a game image displayed on the monitor 2.

The controller 7 wirelessly transmits operation data from a communication section 36 (described below) included therein to the game apparatus 3 to which the reception unit 6 is connected, using, for example, the Bluetooth(R) technique. The controller 7 is operation means for operating an object to be operated (an object displayed on the monitor 2). The controller 7 is provided with an operation section composed of a plurality of operation buttons. The controller 7 also comprises an image capturing information computation section 35 (described below) for capturing an image viewed from the controller 7 as described below. Specifically, the image capturing information computation section 35 captures an image of each of the markers 8a and 8b provided in the vicinity of the monitor 2. The game apparatus 3 uses these images to obtain an operation signal corresponding to a position and an attitude of the controller 7.

Next, a structure of the game apparatus 3 will be described with reference to FIG. 2. Note that FIG. 2 is a functional block diagram of the game apparatus 3.

Figure 2:
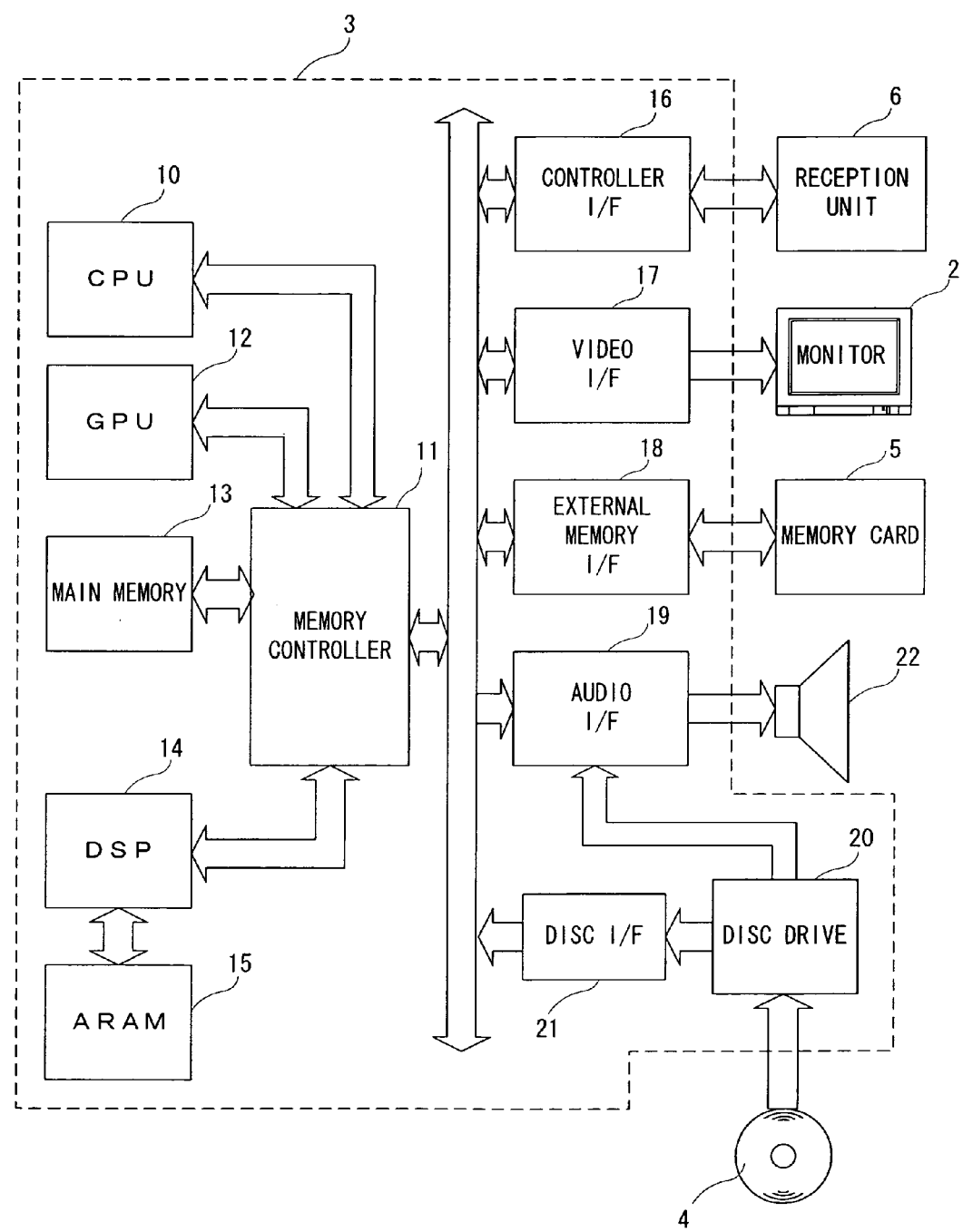
FIG. 2 is a functional block diagram of a game apparatus 3.

In FIG. 2, the game apparatus 3 comprises, for example, a RISC CPU (central processing unit) 10 which executes various programs. The CPU 10 executes a start-up program stored in a boot ROM (not shown) and performs, for example, initialization of memories, such as a main memory 13 and the like, before executing a game program stored in the optical disc 4, and performing, for example, a game process corresponding to the game program. A GPU (Graphics Processing Unit) 12, the main memory 13, a DSP (Digital Signal Processor) 14, and an ARAM (Audio RAM) 15 are connected via a memory controller 11 to the CPU 10. A controller I/F (interface) 16, a video I/F 17, an external memory I/F 18, an audio I/F 19, and a disc I/F 21 are connected via a predetermined bus to the memory controller 11. The reception unit 6, the monitor 2, the external memory card 5, a loudspeaker 22, and a disc drive 20 are connected to the controller I/F 16, the video I/F 17, the external memory I/F 18, the audio I/F 19, and the disc I/F 21, respectively.

The GPU 12 performs image processing based on an instruction from the CPU 10, and is composed of, for example, a semiconductor chip which performs a calculation process required for 3D graphics display. The GPU 12 performs image processing using a memory specialized for image processing or a memory area which is a portion of the main memory 13. The GPU 12 uses these to generate game image data or movie video to be displayed on the monitor 2, and outputs the data via the memory controller 11 and the video I/F 17 to the monitor 2 as appropriate.

The main memory 13 is a memory area used in the CPU 10, and stores a game program or the like required for a process by the CPU 10 as appropriate. For example, the main memory 13 stores a game program, various data, or the like read from the optical disc 4 by the CPU 10. The game program, the various data, or the like stored in the main memory 13 are executed by the CPU 10.

The DSP 14 processes sound data or the like which is generated in the CPU 10 when a game program is executed. The ARAM 15 for storing the sound data or the like is connected to the DSP 14. The ARAM 15 is used when the DSP 14 performs a predetermined process (e.g., storage of a read-ahead game program or sound data) The DSP 14 reads sound data stored in the ARAM 15, and outputs the data via the memory controller 11 and the audio I/F 19 to the loudspeaker 22 included in the monitor 2.

The memory controller 11 performs a centralized control of data transfer. The above-described various I/F are connected to the memory controller 11. The controller I/F 16 is composed of, for example, four controller I/Fs, and communicably connects an external apparatus which can be engaged with the four controller I/Fs via connectors thereof, and the game apparatus 3. For example, the reception unit 6 is engaged with the connector to be connected via the controller I/F 16 to the game apparatus 3. As described above, the reception unit 6 receives operation data from the controller 7, and outputs the operation data via the controller I/F 16 to the CPU 10. Note that, in other embodiments, the game apparatus 3 may comprise a reception module for receiving operation data transmitted from the controller 7, instead of the reception unit 6. In this case, transmitted data received by the reception module is output via a predetermined bus to the CPU 10. The monitor 2 is connected to the video I/F 17. The external memory card 5 is connected to the external memory I/F 18, thereby making it possible to access a backup memory or the like provided in the external memory card 5. The loudspeaker 22 included in the monitor 2 is connected to the audio I/F 19 so that sound data read from the ARAM 15 by the DSP 14 or sound data directly output from the disc drive 20 can be output from the loudspeaker 22. The disc drive 20 is connected to the disc I/F 21. The disc drive 20 reads data stored at a predetermined read-out position in the optical disc 4, and outputs the data to the bus and the audio I/F 19 of the game apparatus 3.

Figure 3A:
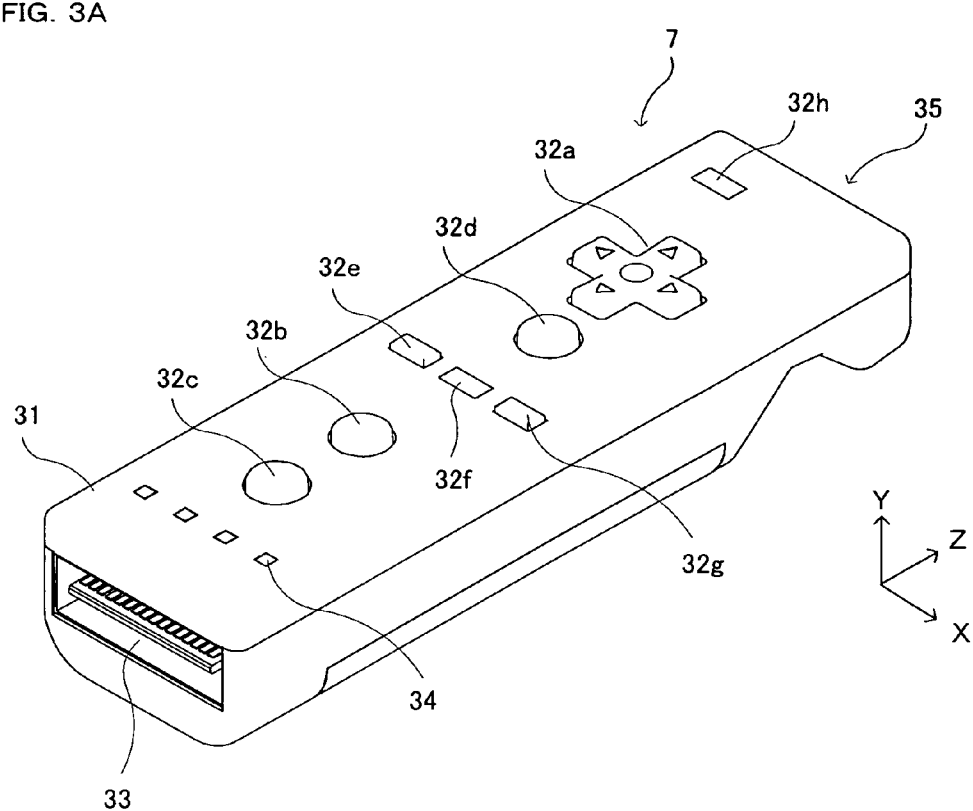
FIG. 3A is a perspective view of a controller 7.
Figure 3B:
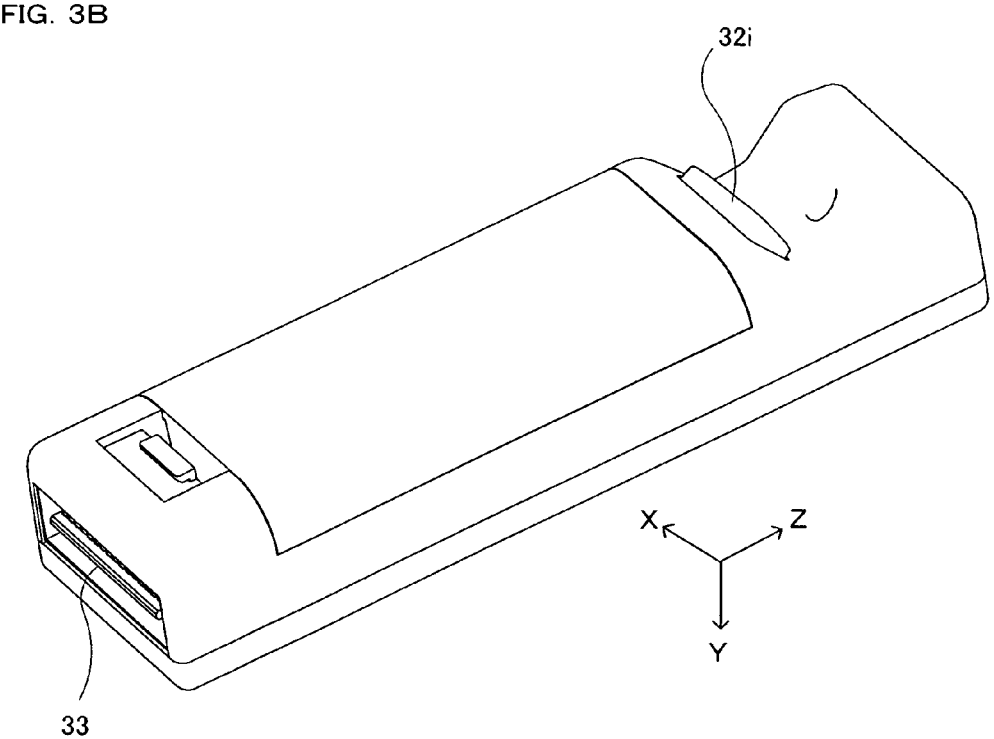
FIG. 3B is a perspective view of the controller 7.
Figure 4:
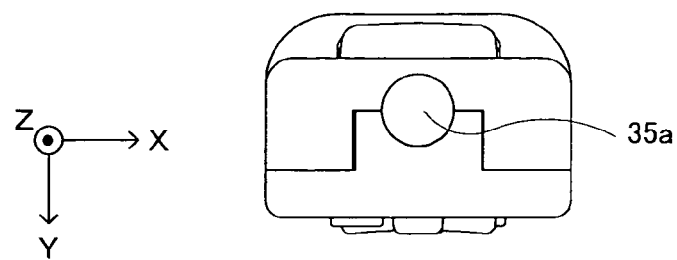
FIG. 4 is a diagram of the controller 7 as viewed from the front.

Next, the controller 7 will be described with reference to FIGS. 3A to 7. FIGS. 3A to 5 are perspective views of an outer appearance structure of the controller 7. FIG. 3A is a perspective view of the controller 7 as viewed from the top and the rear, and FIG. 3B is a perspective view of the controller 7 as viewed from the bottom and the rear. FIG. 4 is a front view of the controller 7.

In FIGS. 3A, 3B, and 4, the controller 7 has a housing 31 formed by, for example, plastic molding. The housing 31 is in the shape of substantially a rectangular parallelepiped in which a front-to-rear direction (a Z-axis direction in FIGS. 3A and 3B) is a longitudinal direction. The whole housing 31 has a size which allows an adult and a child to hold the controller 7 with one hand. The player can perform game operations by using the controller 7, i.e., pushing down the buttons provided on the controller 7 or changing a position and an orientation of the controller 7 itself. For example, the player can cause an object to be operated to perform a movement behavior by rotating the controller 7 around the longitudinal direction as an axis. The player can also cause the object appearing in a game space to move by changing a position on the screen which is pointed by the controller 7. As used herein, the term "position on the screen which is pointed by the controller 7" ideally refers to a position of an intersection of a straight line extending from a front end of the controller 7 in the longitudinal direction and the screen of the monitor 2, but does not need to be exactly such a position, and may be a position which is in the vicinity thereof and can be calculated by the game apparatus 3. Hereinafter, a position on the screen which is pointed by the controller 7 is referred to as a "pointed position". The longitudinal direction of the controller 7 (the housing 31) may be referred to as a "pointing direction of the controller 7".

The housing 31 is provided with a plurality of operation buttons. On an upper surface of the housing 31, a cross key 32a, an X button 32b, an Y button 32c, a B button 32d, a select switch 32e, a menu switch 32f, and a start switch 32g are provided. On the other hand, a hollow portion is formed on a lower surface of the housing 31, and an A button 32i is provided on a rear slope surface of the hollow portion. These buttons (switches) are assigned with respective functions, depending on a game program executed by the game apparatus 3. These functions are not directly involved with the description of the present invention and will not be described in detail. Further, a power switch 32h for remotely switching ON/OFF the power source of the game apparatus 3 is provided on the upper surface of the housing 31.

Figure 5A:
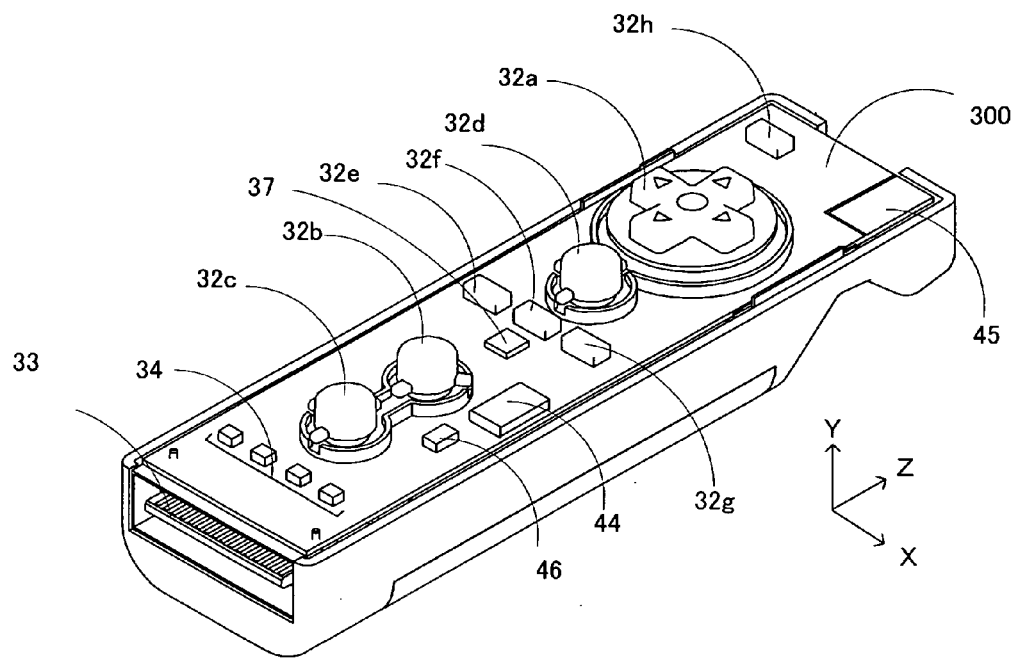
FIG. 5A is a diagram illustrating an internal structure of the controller 7.
Figure 5B:
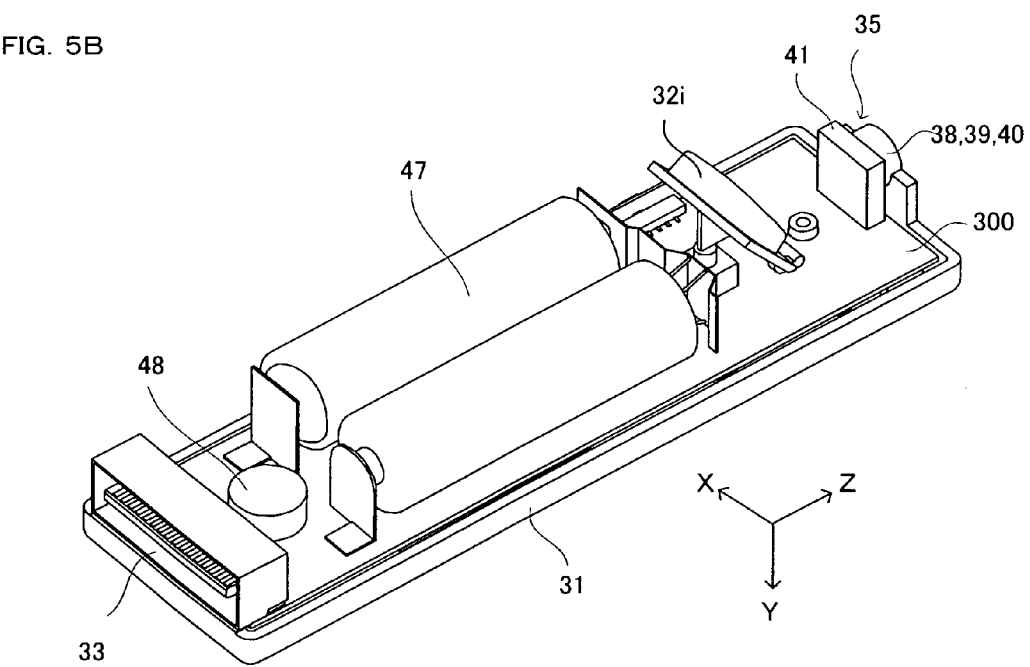
FIG. 5B is a diagram illustrating the internal structure of the controller 7.

The controller 7 has the image capturing information computation section 35 (FIG. 5B). As illustrated in FIG. 4, a light entering opening 35a of the image capturing information computation section 35 is provided on a front surface of the housing 31. On the other hand, a connector 33 is provided on a rear surface of the housing 31. The connector 33 is, for example, a 32-pin edge connector which is utilized so as to connect other apparatuses to the controller 7. A plurality of LEDs 34 are provided on a rear side of the upper surface of the housing 31. Here, the controller 7 is assigned with controller identification (number) so as to distinguish it from other controllers 7. The LEDs 34 are used so as to inform the player of controller identification currently set for the controller 7. Specifically, when operation data is transmitted from the controller 7 to the game apparatus 3, one of the plurality of LEDs 34 is turned ON, depending on the controller identification.

Next, an internal structure of the controller 7 will be described with reference to FIGS. 5A, 5B, and 6. FIGS. 5A and 5B are diagrams illustrating the internal structure of the controller 7. Note that FIG. 5A is a perspective view of the controller 7 where an upper housing (a portion of the housing 31) is cut away. FIG. 5B is a perspective view of the controller 7 where a lower housing (a portion of the housing 31) is cut away. FIG. 5B illustrates a perspective view of a base board 300 of FIG. 5A as viewed from a bottom surface thereof.

In FIG. 5A, the base board 300 is fixed inside the housing 31. On an upper major surface of the base board 300, operation buttons 32a to 32h, an acceleration sensor 37, the LEDs 34, a quartz oscillator 46, a radio module 44, an antenna 45, and the like are provided. These are connected to a microcomputer 42 (see FIG. 6) via a conductor (not shown) formed on the base board 300 or the like. The controller 7 functions as a wireless controller by means of the radio module 44 and the antenna 45. Note that the quartz oscillator 46 generates a basic clock for the microcomputer 42 (described below).

On the other hand, in FIG. 5B, the image capturing information computation section 35 is provided at a front edge of a lower major surface of the base board 300. The image capturing information computation section 35 is composed of an infrared filter 38, a lens 39, an image capturing element 40, and an image processing circuit 41, which are attached to the lower major surface of the base board 300 in this order from the front of the controller 7. The connector 33 is attached to a rear edge of the lower major surface of the base board 300. The operation button 32i is attached at the rear of the image capturing information computation section 35 and on the lower major surface of the base board 300. Batteries 47 are housed at the rear of the operation button 32i. A vibrator 48 is attached on the lower major surface of the base board 300 and between the batteries 47 and the connector 33. The vibrator 48 may be, for example, a vibration motor or solenoid. Vibration occurs in the controller 7 by an action of the vibrator 48, and is transferred to the player who is holding the controller 7, thereby achieving a so-called game supporting the vibration feature.

Figure 6:
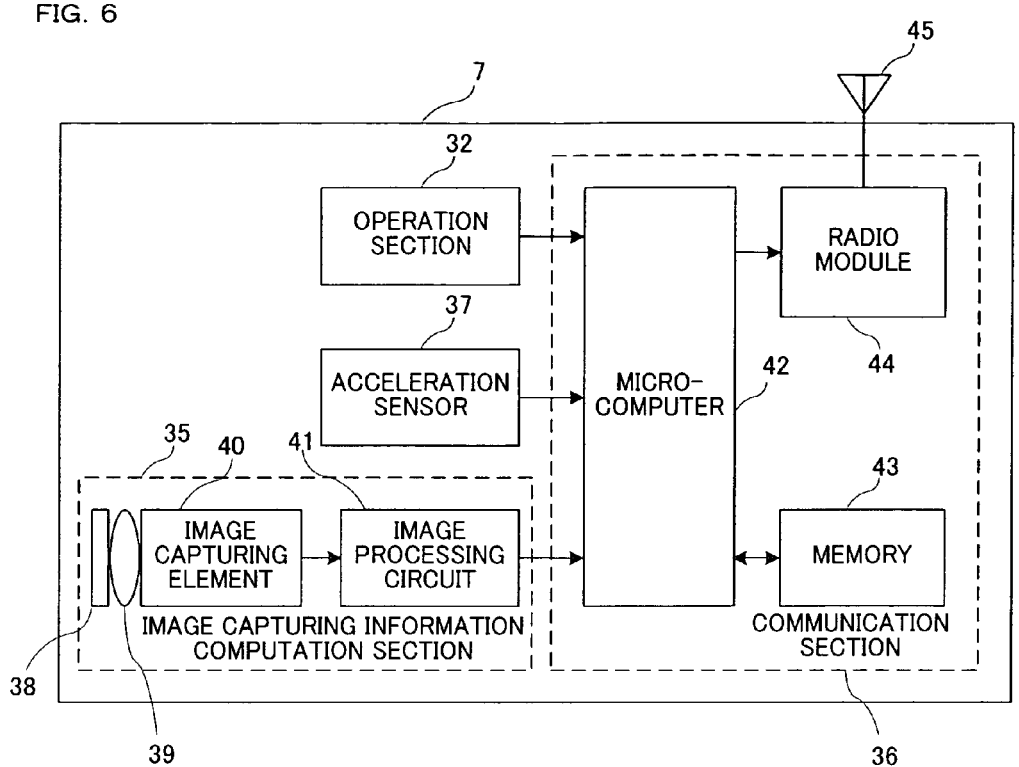
FIG. 6 is a block diagram illustrating a structure of the controller 7.

FIG. 6 is a block diagram illustrating a structure of the controller 7. The controller 7 comprises the communication section 36 and the acceleration sensor 37 in addition to the operation section 32 (each operation button) and the image capturing information computation section 35.

The image capturing information computation section 35 is a system for analyzing image data captured by the image capturing means to determine a place having a high luminance and detecting a center-of-gravity position or a size of the place. The image capturing information computation section 35 has, for example, a maximum sampling cycle of about 200 frames/sec, and therefore, can track and analyze relatively high-speed movement of the controller 7.

Specifically, the image capturing information computation section 35 includes the infrared filter 38, the lens 39, the image capturing element 40, and the image processing circuit 41. The infrared filter 38 passes only infrared light entering from the front of the controller 7. Here, the markers 8a and 8b provided in the vicinity of the display screen of the monitor 2 are infrared LEDs which output infrared light toward the front of the monitor 2. Therefore, by providing the infrared filter 38, the images of the markers 8a and 8b can be more correctly captured. The lens 39 collects infrared light passing through the infrared filter 38 and causes the light to enter the image capturing element 40. The image capturing element 40 may be, for example, a solid-state image capturing element, such as a CMOS sensor or a CCD, and captures infrared light collected by the lens 39. Therefore, the image capturing element 40 captures only infrared light passing through the infrared filter 38 to generate image data. Hereinafter, an image captured by the image capturing element 40 is referred to as a captured image. The image data generated by the image capturing element 40 is processed by the image processing circuit 41. The image processing circuit 41 calculates positions of objects whose images are to be captured (markers 8a and 8b) in the captured image. The image processing circuit 41 outputs coordinate values indicating the positions of the markers 8a and 8b in the captured image, as captured image data, to the communication section 36. Note that the process of the image processing circuit 41 will be described in detail below.

As shown in FIG. 6, the controller 7 preferably includes a three-axis, linear acceleration sensor 37 that detects linear acceleration in three directions, i.e., the up/down direction (Y-axis shown in FIGS. 3A and 3B), the left/right direction (X-axis shown in FIGS. 3A and 3B), and the forward/backward direction (Z-axis shown in FIGS. 3A and 3B). Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer tilt of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

With the acceleration outputs of the three-axis acceleration sensor, it is possible to calculate tilts of the controller 7 with respect to the X-, Y-, and Z-axis directions. Thus, the game apparatus 3 can determine a rotation angle around the Z axis of the controller 7 not only from the captured image but also by using the acceleration data from the acceleration sensor 37. Data indicating the accelerations detected by the acceleration sensor 37 is output to the communication section 36.

In another exemplary embodiment, the acceleration sensor 37 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 37, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application.

More specifically, when a tilt or inclination is calculated using a gyroscope instead of the acceleration sensor, significant changes are necessary. Specifically, when using a gyro-sensor, the value of inclination is initialized at the start of detection. Then, data on the angular velocity which is output from the gyroscope is integrated. Next, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an accelerometer is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communication section 36 includes the microcomputer 42, a memory 43, the radio module 44, and the antenna 45. The microcomputer 42 controls the radio module 44 which wirelessly transmits data obtained by the microcomputer 42, while using the memory 43 as a memory area.

Data output from the operation section 32, the acceleration sensor 37, and the image capturing information computation section 35 to the microcomputer 42 is temporarily stored in the memory 43. Here, wireless transmission from the communication section 36 to the reception unit 6 is performed in predetermined cycles. Since a game process is generally performed in units of 1/60 (sec), transmission needs to be performed in cycles which are shorter than 1/60 (sec). When the timing of transmission to the reception unit 6 arrives, the microcomputer 42 outputs data stored in the memory 43 as operation data to the radio module 44. The radio module 44 uses, for example, the Bluetooth(R) technique to modulate a carrier wave having a predetermined frequency with the operation data, and emits a resultant weak radio wave signal from the antenna 45. In other words, the operation data is modulated by the radio module 44 into the weak radio wave signal, which is in turn transmitted from the controller 7. The weak radio wave signal is received by the reception unit 6 on the game apparatus 3 side. By demodulation or decoding of the received weak radio wave signal, the game apparatus 3 can obtain the operation data. The CPU 10 of the game apparatus 3 performs a game process based on the obtained operation data and a game program.

Note that the shape of the controller 7 and the shapes, number, positions, and the like of the operation switches of FIGS. 3A to 5B are only for illustrative purposes, and the present invention can be achieved with other shapes, number, and positions. The position (the light entering opening 35a of the image capturing information computation section 35) of the image capturing information computation section 35 in the controller 7 may not be on the front surface of the housing 31, and may be provided on other surfaces if light can be taken in from the outside of the housing 31. In this case, the above-described "pointing direction of the controller 7" is a direction perpendicular to the light entering opening 35a, i.e., the image capturing direction of the image capturing element 40.

By using the controller 7, the player can perform game operations, such as moving the position of the controller 7 itself, rotating the controller 7, and the like, in addition to a conventional general game operation of pushing down various operation switches. Hereinafter, game operations using the controller 7 will be described.

Figure 7:
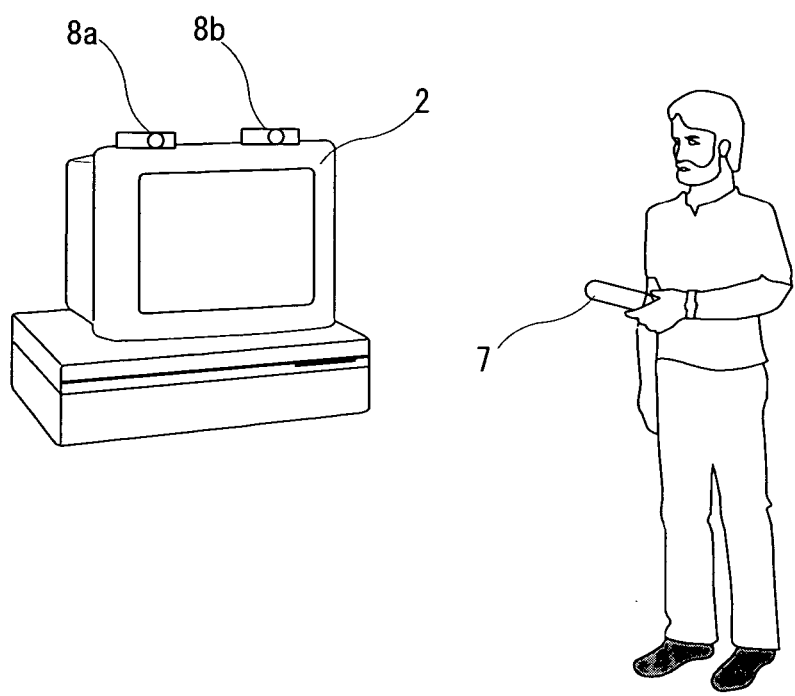
FIG. 7 is a diagram for roughly explaining a situation when the controller 7 is used to perform a game operation.

FIG. 7 is a diagram roughly illustrating a situation in which a game operation is performed using the controller 7. As illustrated in FIG. 7, when a game is played using the controller 7 in the game system 1, the player holds the controller 7 with one hand. Here, the markers 8a and 8b are provided in parallel to a widthwise direction of the screen of the monitor 2. The player holds the controller 7 so that the front surface of the controller 7 (a side on which an opening through which light to be captured by the image capturing information computation section 35 enters is provided) faces the markers 8a and 8b. In this situation, the player performs a game operation by changing a position (pointed position) on the screen which is pointed by the controller 7 or changing a distance between the controller 7 and each of the markers 8a and 8b.

Figure 8:
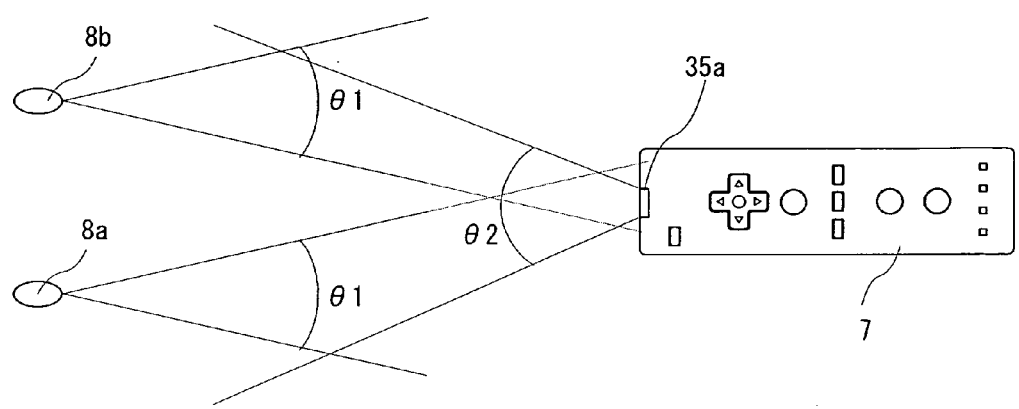
FIG. 8 is a diagram for explaining a visual field angle between markers 8a and 8b and the controller 7.

FIG. 8 is a diagram for explaining visual field angles between the markers 8a and 8b and the controller 7. As illustrated in FIG. 8, each of the markers 8a and 8b emits infrared light within a visual field angle range of θ1. The image capturing element 40 of the image capturing information computation section 35 can receive light within a visual field angle range of θ2 around a line of sight of the controller 7 as a center. For example, the visual field angle θ1 of each of the markers 8a and 8b is 34° (half value angle), and the visual field angle θ2 of the image capturing element 40 is 41°. The player holds the controller 7 so that the image capturing element 40 takes a position and an orientation which allow reception of infrared light from the two markers 8a and 8b. Specifically, the player holds the controller 7 so that at least one of the markers 8a and 8b is present within the visual field angle θ2 of the image capturing element 40, and the controller 7 is present within the visual field angle θ1 of at least one of the markers 8a and 8b. In this situation, the controller 7 can detect the markers 8a and/or 8b. The player can perform a game operation by changing the position and orientation of the controller 7 within a range which satisfies this situation. Note that, when the position and orientation of the controller 7 are outside this range, a game operation can no longer be performed based on the position and orientation of the controller 7. Hereinafter, the above-described range is referred to as an "operation allowable range".

Figure 9:
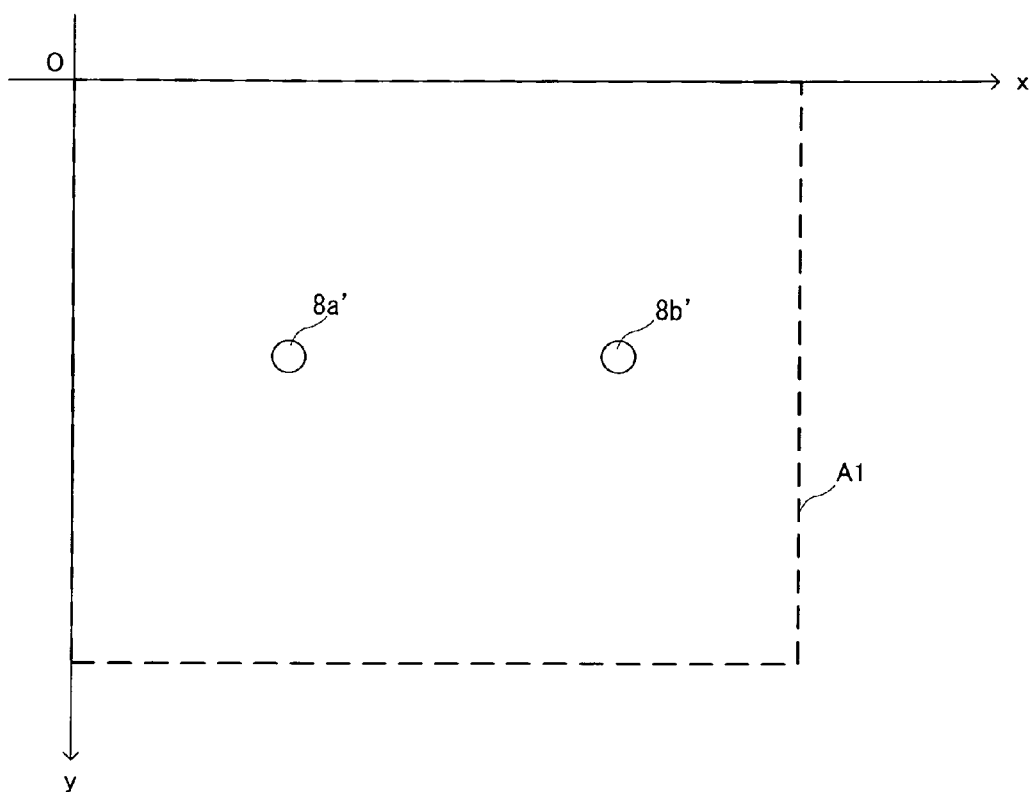
FIG. 9 is a diagram illustrating an exemplary captured image including an object image.

When the controller 7 is held within the operation allowable range, the image capturing information computation section 35 captures an image of each of the markers 8a and 8b. Specifically, a captured image obtained by the image capturing element 40 includes the image (object image) of each of the markers 8a and 8b. FIG. 9 is a diagram an exemplary captured image including the object images. Note that, in FIG. 9, an area A1 enclosed with a dashed line indicates an area within the captured image. Using image data of the captured image including the object images, the image processing circuit 41 detects coordinates indicating a position of each of the markers 8a and 8b in the captured image.

Specifically, the image processing circuit 41 detects coordinates indicating a position in an area which satisfies a predetermined condition in the captured image, for each area. Here, the predetermined condition is for detection of the object image, specifically including that the area is an area whose luminance is higher than or equal to a predetermined value (high luminance area) and that the area has a size within a predetermined range. Note that the predetermined condition may be for detection of an object whose image is to be captured, or in other embodiments, may include a condition for a color of an image. In the image data of the captured image, the object image appears as a high luminance area. Therefore, the image processing circuit 41 initially detects this high luminance area as a candidate for the object image. Next, based on a size of the high luminance area thus detected, it is determined whether or not the high luminance area is the object image. The captured image may contain an image caused by sunlight through a window or light of a fluorescent tube in a room in addition to images 8a' and 8b' of the two markers 8a and 8b, that are the object images. The above-described determination process is for distinguishing the images 8a' and 8b' of the markers 8a and 8b (object images) from other images to correctly detect the object images. Specifically, in the determination process, it is determined whether or not the detected high luminance area has a size within a predetermined range. When the high luminance area has a size within the predetermined range, the high luminance area is determined to be the object image. When the size of the high luminance area is not within the predetermined range, the high luminance area is determined to be an image other than the object image.

Further, for a high luminance area which is determined to represent the object image as a result of the determination process, the image processing circuit 41 calculates a position of the high luminance area. Specifically, a position of the center of gravity of the high luminance area is calculated. Note that the position of the center of gravity can be calculated with a scale higher than the resolution of the image capturing element 40. Here, it is assumed that the image captured by the image capturing element 40 has a resolution of 126×96 and the position of the center of gravity is calculated with a scale of 1024×768. In other words, the coordinates of the position of the center of gravity is represented with integer values in the range of (0, 0) to (1024, 768). Note that the position of the captured image is represented with a coordinate system (xy coordinate system) in which, as illustrated in FIG. 9, the upper left of the captured image is the origin, a down direction is the positive direction of the y axis, and a right direction is the positive direction of the x axis. The image processing circuit 41 outputs data indicating coordinates calculated by the calculation process. The coordinate data thus output is transmitted as operation data by the microcomputer 42 to the game apparatus 3 as described above. Note that, in this example, the processes until the coordinates of the position of the object image from the captured image are calculated are performed by the image processing circuit 41 and/or the microcomputer 42 of the controller 7. Alternatively, for example, the captured image can be transferred to the game apparatus 3, and processes equivalent to the subsequent processes can be performed by the CPU 10 and the like of the game apparatus 3.

As described above, the image processing circuit 41 detects coordinates indicating a position in an area which satisfies the predetermined condition in the captured image, for each area. Note that, in the following description, coordinates detected by the image processing circuit 41 may be referred to as "detected coordinates" or a "detected coordinate point" for the purpose of distinguishing them from marker coordinates described below.

Here, when the markers 8a and 8b are correctly detected by the image processing circuit 41, the number of detected coordinate points is two. However, when the markers are not correctly detected, the number of high luminance areas having sizes within the predetermined range is not necessarily two, i.e., the number of detected coordinate points may be 0, 1, or 3 or more. For example, when noise is included in the captured image, three or more coordinate points may be detected. Noise is included in the captured image, for example, when an image similar to a marker is displayed on the screen of the monitor 2, or an object emitting infrared light similar to that of a marker is present in the vicinity of the monitor 2. Also, for example, when the controller 7 is excessively distant from the markers 8a and 8b, or some obstacle is present between the controller 7 and the markers 8a and 8b, only zero or one, but not two, coordinate points may be detected. When only one of the markers 8a and 8b is included in the visual field angle of the image capturing element 40 of the controller 7, only one coordinate point corresponding to the one of the markers is detected.

Note that, when the number of detected coordinate points is two, a shifted state or a rotated state of the controller 7 can be detected based on the detected coordinates using a method described below (see FIG. 16). However, when the number of detected coordinate points is not two, the shift or rotation of the controller 7 cannot be correctly detected directly from the detected coordinates.

Therefore, in this embodiment, a process of calculating two correct coordinate points corresponding to the markers 8a and 8b is performed using detected coordinates (calculation process). Hereinafter, the two correct coordinate points corresponding to the markers 8a and 8b, which are calculated as a result of the calculation process, are referred to as "marker coordinates" or "marker coordinate points". Further, in this embodiment, for the purpose of distinguishing the two marker coordinate points from each other, one of the marker coordinate points is referred to as a first marker coordinate point, while the other is referred to as a second marker coordinate point. Note that, in the game apparatus 3 of this embodiment, four calculation processes (first to fourth calculation process) are used as described in detail below. Also as described in detail below, the game apparatus 3 of this embodiment selects and uses the first to fourth calculation processes, depending on the situation, thereby effectively utilizing the first to fourth calculation processes. Hereinafter, the first to fourth calculation processes will be roughly described with reference to FIGS. 10 to 15B.

Figure 10:
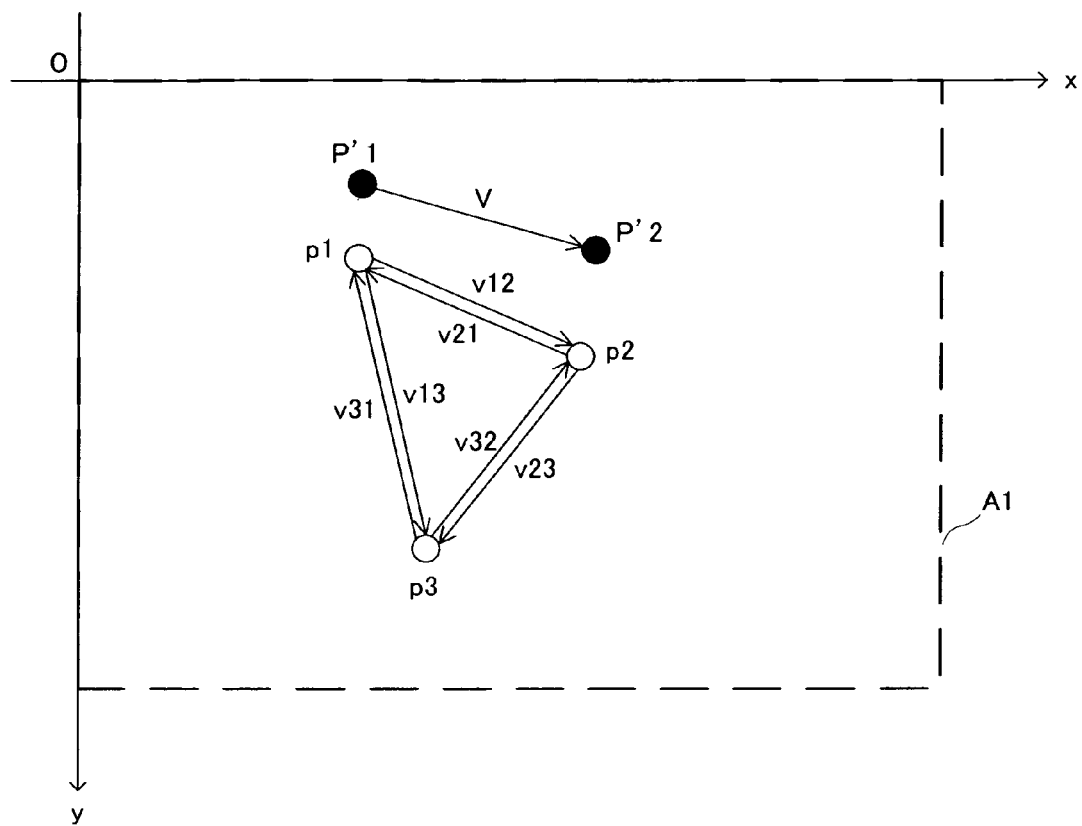
FIG. 10 is a diagram for explaining a first calculation process.

Firstly, the first calculation process will be described. The first calculation process is a process of selecting the marker coordinate points from two or more coordinate points. The first calculation process can be used when the number of detected coordinate points is two or more. FIG. 1 is a diagram for explaining the first calculation process. In FIG. 10, a point p1, a point p2, and a point p3 indicate positions of currently detected coordinate points. Specifically, in FIG. 10, it is assumed that three coordinate points are detected by the image processing circuit 41, and operation data containing data indicating the three coordinate points is transferred from the controller 7 to the game apparatus 3. Also, in FIG. 10, a point P'1 and a point P'2 indicate positions of the previous marker coordinate points. Specifically, the point P'1 corresponds to the first marker coordinate point, and the point P'2 corresponds to the second marker coordinate point. The previous marker coordinate point is a marker coordinate point determined at the previous time, i.e., a marker coordinate point which was calculated as a result of the previous calculation process using a detected coordinate point detected at the previous time by the image processing circuit 41. Note that, in FIG. 10, an area A1 enclosed with a dashed line indicates an area of the captured image.

In the first calculation process, initially, the game apparatus 3 selects a combination of two detected coordinate points indicating correct positions of the markers 8a and 8b from the combinations of three detected coordinate points. Specifically, initially, the game apparatus 3 calculates a vector whose start point is one of the detected coordinate points and whose end point is another one of the detected coordinate points, for all combinations of the detected coordinate points. In the example of FIG. 10, since the number of detected coordinate points is three, the game apparatus 3 calculates the following six vectors.

(1) a vector v12 whose start point is the point p1 and whose end point is the point p2
(2) a vector v21 whose start point is the point p2 and whose end point is the point p1
(3) a vector v13 whose start point is the point p1 and whose end point is the point p3

(4) a vector v31 whose start point is the point p3 and whose end point is the point p1
(5) a vector v23 whose start point is the point p2 and whose end point is the point p3
(6) a vector v32 whose start point is the point p3 and whose end point is the point p2

In the first calculation process, from these vectors, a vector most similar to a reference vector (the previous vector described below) is selected.

Next, the game apparatus 3 calculates the previous vector which is determined based on the previous marker coordinate points. The previous vector is a reference vector which is used when one vector is selected from the vectors calculated from the detected coordinate points. In this embodiment, the previous vector is a vector whose start point is the first marker coordinate point and whose end point is the second marker coordinate point. In the example of FIG. 10, the game apparatus 3 calculates, as the previous vector, a vector V whose start point is the point P'1 corresponding to the first marker coordinate point and whose end point is the point P'2 corresponding to the second marker coordinate point.

Next, the game apparatus 3 selects a vector which is most similar to the previous vector among the vectors calculated from the detected coordinate points. In this embodiment, a similarity is calculated in terms of the length and the direction for each vector, and a vector having a highest similarity is selected. In the example of FIG. 10, for example, the vector v12 is selected as a vector which is most similar to the previous vector V. Note that a method of calculating the similarity will be described below. For the selected vector, a coordinate point which is the start point is determined as a first marker coordinate point and a coordinate point which is the end point is determined as a second marker coordinate point.

In the first calculation process, a combination of two coordinate points which constitute a vector most similar to the previous vector is selected. Here, it is considered that, whereas the process of calculating two marker coordinate points is performed several ten times or several hundred times per second as described above, the player translates the controller 7 by only a small distance in the Z-axis direction while the process is performed one time. Also, it is considered that the player rotates the controller 7 around the Z axis by only a small angle while the process is performed one time. Therefore, it is considered that the amount of a change in the length and direction of a vector connecting the marker coordinate points while the process is performed one time, is small. Therefore, by selecting two coordinate points which constitute a vector most similar to the previous vector among the detected coordinate points, two marker coordinate points can be correctly calculated even when three or more coordinate points are detected.

Figure 11:
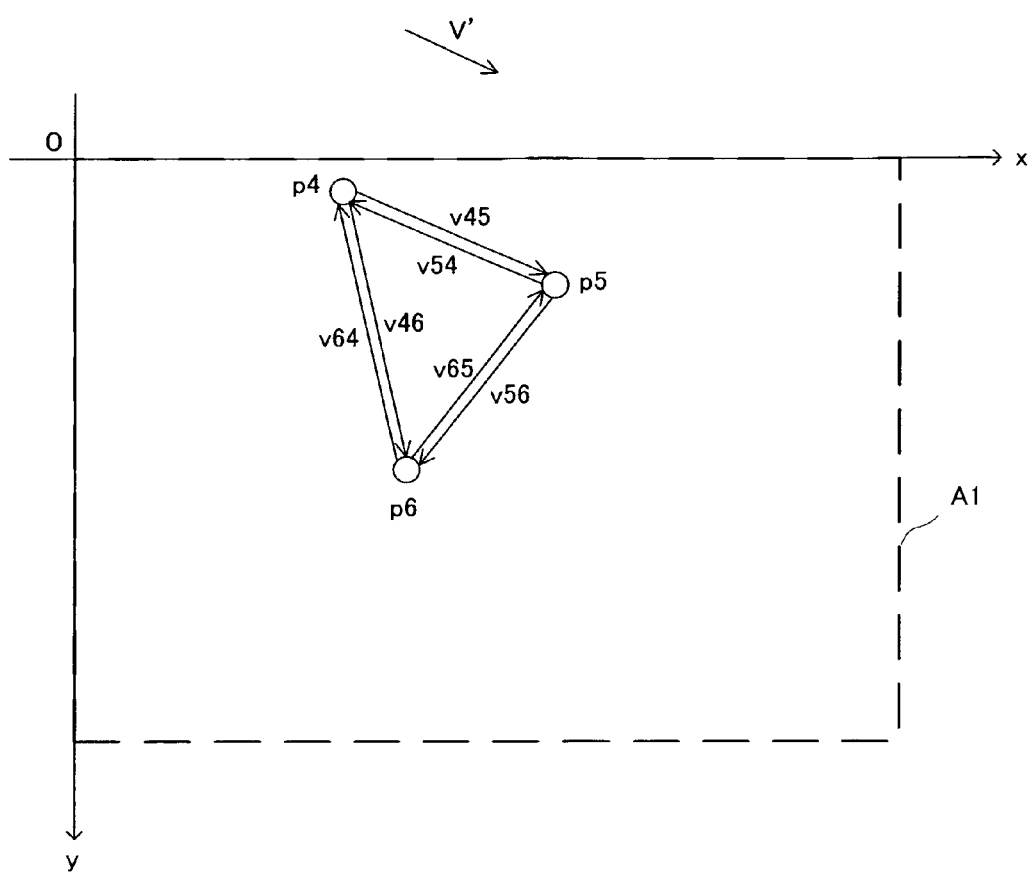
FIG. 11 is a diagram for explaining a second calculation process.

Next, the second calculation process will be described. The second calculation process is a process of selecting marker coordinate points from two or more coordinate points, as in the first calculation process. The second calculation process can be used when the number of detected coordinate points is two or more. FIG. 11 is a diagram for explaining the second calculation process. In FIG. 11, a point p4, a point p5, and a point p6 indicate positions of currently detected coordinate points. In FIG. 11, a vector V' indicated outside the coordinate area of the xy coordinate system is an assumed vector. The assumed vector refers to a vector which is assumed as a vector connecting current marker coordinate points. More specifically, the assumed vector refers to a vector whose start point is a coordinate point which is assumed to be a current first marker coordinate point and whose end point is a coordinate point which is assumed to be a current second marker coordinate point. The assumed vector is calculated based on an output of the acceleration sensor 37.

In the second calculation process, initially, the game apparatus 3 selects a combination of two detected coordinate points indicating correct positions of the markers 8a and 8b among three detected coordinate points, as in the first calculation process. In the example of FIG. 11, since the number of detected coordinate points is three, the game apparatus 3 calculates six vectors, i.e., a vector v45 whose start point is the point p4 and whose end point is the point p5, a vector v54 whose start point is the point p5 and whose end point is the point p4, a vector v46 whose start point is the point p4 and whose end point is the point p6, a vector v64 whose start point is the point p6 and whose end point is the point p4, a vector v56 whose start point is the point p5 and whose end point is the point p6, and a vector v65 whose start point is the point p6 and whose end point is the point p5. In the second calculation process, from these vectors, a vector which is most similar to a reference vector (assumed vector) is selected.

Next, the game apparatus 3 calculates the assumed vector. The assumed vector is a reference vector with which one vector is selected from vectors calculated from detected coordinate points, as with the previous vector used in the first calculation process. In this embodiment, the assumed vector is calculated based on a vector indicating an acceleration detected by the acceleration sensor 37. Note that a specific method of calculating the assumed vector will be described below. In the example of FIG. 11, the assumed vector V' illustrated in FIG. 11 is assumed to have been calculated. Note that, in the second calculation process of this embodiment, the assumed vector V' is a unit vector having a length of 1, for example.

Next, the game apparatus 3 selects a vector which indicates a direction most similar to a direction indicated by the assumed vector, among the vectors calculated from the detected coordinate points. In the example of FIG. 11, a direction indicated by the vector v45 is most similar to the direction indicated by the assumed vector, and therefore, the vector v45 is selected. The game apparatus 3 determines a coordinate point which is the start point of the selected vector as a first marker coordinate point, and a coordinate point which is the end point thereof as a second marker coordinate point.

In the second calculation process, a combination of coordinate points which constitute a vector indicating a direction most similar to the direction indicated by the assumed vector, is selected. In the second calculation process, a tilt of the controller 7 is calculated from the linear acceleration output of the acceleration sensor 37, a positional relationship between the images of the markers 8a and 8b in the captured image is assumed from the tilt of the controller 7. As described above, in the second calculation process, the selection is performed, taking into consideration an actual tilt of the controller 7. Therefore, according to the second calculation process, two marker coordinate points can be correctly calculated even when three or more coordinate points are detected.

As described above, according to the first calculation process and the second calculation process, a reference for selection of two marker coordinate points from a plurality of detected coordinate points is set. Specifically, in the first calculation process, the previous vector is set as a reference, and in the second calculation process, the assumed vector is set as a reference. Thus, by using the reference, two marker coordinate points can be selected even when the number of detected coordinate points is three or more. The reference may indicate a length between two coordinate points, and the reference length may be compared with a length between two coordinate points. Alternatively, as with the assumed vector used in the second calculation process, the reference may indicate a direction connecting two coordinate points. Alternatively, as with the previous vector used in the first calculation process, the reference may indicate a length between two coordinate points and a direction between the two coordinate points. Also, in this embodiment, the reference varies depending on a situation, such as the previous marker coordinate point and the tilt of the controller 7. Alternatively, in other embodiments, the reference may be determined in advance. For example, when it is assumed that the controller 7 is used while a tilt from the image capturing direction as an axis is kept constant, a vector indicating a direction parallel to the x axis may be used as a reference. Alternatively, for example, when it is assumed that the controller 7 is used while a distance from the controller 7 to the markers 8a and 8b is kept substantially constant, a vector having a predetermined length may be used as a reference.

The first calculation process and the second calculation process are each a process which is performed for the purpose of selection of two correct marker coordinate points when the number of detected coordinate points is three or more. Here, current marker coordinate points are calculated using the previous marker coordinate points in the first calculation process, while current marker coordinate points are calculated using the output of the acceleration sensor 37 in the second calculation process. In this point, the first and second calculation processes are different from each other. Note that, when marker coordinate points are correctly calculated in the previous marker coordinate calculation process, the marker coordinate points can be correctly calculated using the first calculation process, though depending on detection precision of the acceleration sensor 37 or the like. On the other hand, since the second calculation process can calculate current marker coordinate points without the previous marker coordinate points, use of the second calculation process is effective when the previous marker coordinate points are not correctly calculated and when it is doubtful whether or not the previous marker coordinate points are correct.

Figure 12:
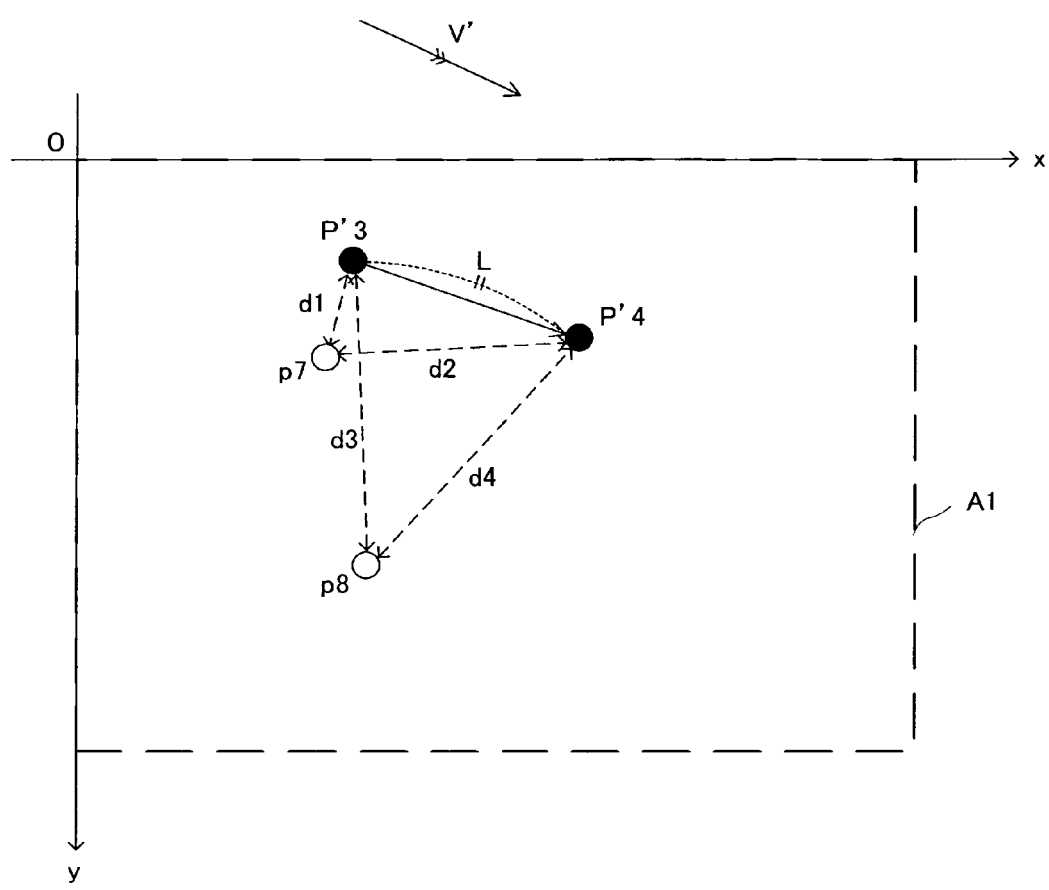
FIG. 12 is a diagram for explaining a third calculation process.

Next, the third calculation process will be described. The third calculation process is a process of assuming one of the detected coordinate points as one of the marker coordinate points, and from the detected coordinate point as the one marker coordinate point, calculating the other marker coordinate point. Note that the third calculation process can be used when the number of detected coordinate points is one or more. FIG. 12 is a diagram for explaining the third calculation process. In FIG. 12, a point p7 and a point p8 indicate positions of currently detected coordinate points. In FIG. 12, a point P'3 and a point P'4 indicate positions of the previous marker coordinate points. Specifically, the point P'3 corresponds to the first marker coordinate point, and the point P'4 corresponds to the second marker coordinate point. Also, in FIG. 12, a vector V' indicated outside a coordinate area of the xy coordinate system is an assumed vector. In the third calculation process, the assumed vector is calculated based on the previous marker coordinate points and the output of the acceleration sensor 37.

In the third calculation process, initially, the game apparatus 3 selects a correct one of the detected coordinate points which corresponds to one of the markers 8a and 8b. Specifically, a distance between each of the previous marker coordinate points and each of the detected coordinate points is calculated, and a detected coordinate point included in a combination having a shortest distance is selected. In the example of FIG. 12, a distance between the point P'3 and the point p7 is assumed to be d1, a distance between the point P'4 and the point p7 is assumed to be d2, a distance between the point P'3 and the point p8 is assumed to be d3, and a distance between the point P'4 and the point p8 is assumed to be d4. In this case, the distance d1 between the point P' 3 and the point p7 is shortest. Therefore, the combination having the shortest distance is a combination of a first marker coordinate point corresponding to the point P'3 and a detected coordinate point corresponding to the point p7, and therefore, the detected coordinate point included in the combination is selected. Also, the game apparatus 3 determines whether the detected coordinate point thus selected is a first marker coordinate point or a second marker coordinate point, depending on whether the previous marker coordinate point included in the combination is a first marker coordinate point or a second marker coordinate point. In the example of FIG. 12, since a marker coordinate point corresponding to the point P'3 is the previous first marker coordinate point, the detected coordinate point corresponding to the point p7 is determined as a first marker coordinate point.

Next, the game apparatus 3 calculates an assumed vector as in the second calculation process. Here, whereas the assumed vector is a unit vector having a length of, for example, 1 in the second calculation process, the length of the assumed vector is further determined in the third calculation process. Specifically, in the game apparatus 3, it is assumed that the length of the assumed vector is a length between the two previous marker coordinate points.

Figure 13:
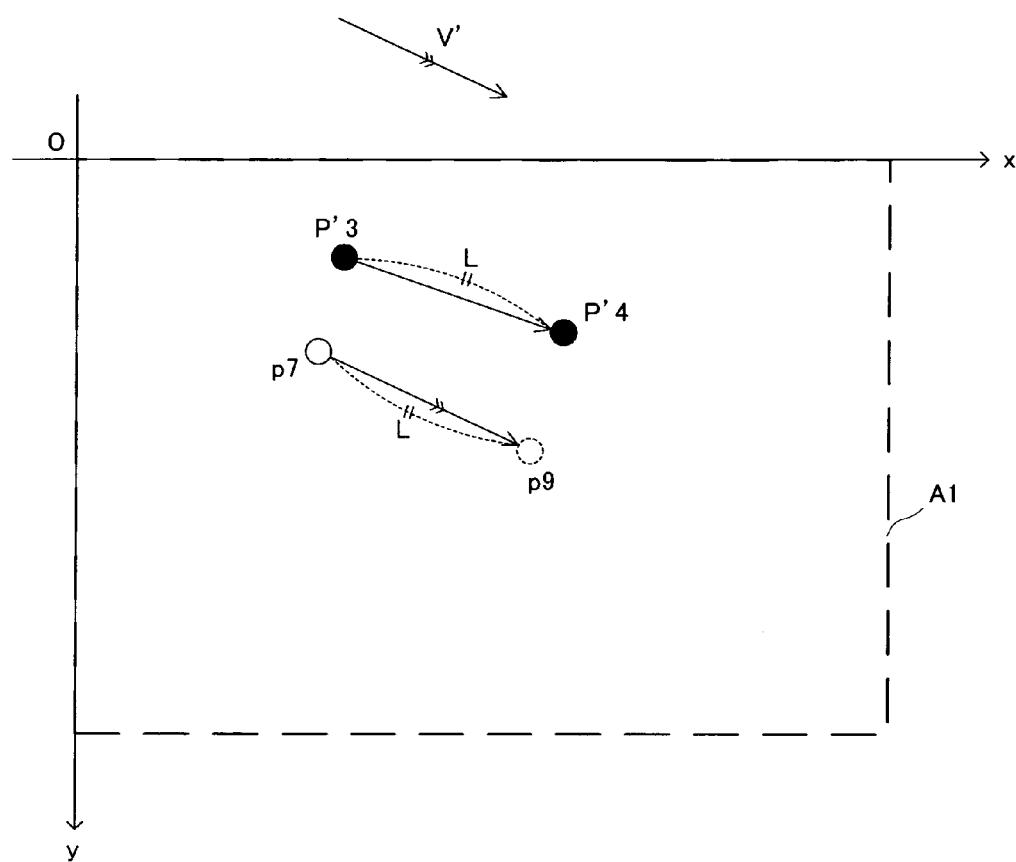
FIG. 13 is a diagram for explaining a process of calculating the other marker coordinate point in the third calculation process.

Next, the game apparatus 3 calculates the other marker coordinate which has not been determined, using the assumed vector. Specifically, when a first marker coordinate point has already been determined, a second marker coordinate point which is the other marker coordinate point is a coordinate point indicating a position which is shifted by the length of the assumed vector in the direction of the assumed vector from the position of the first marker coordinate point as a base point. When the second marker coordinate point has already been determined, the first marker coordinate point which is the other marker coordinate point is a coordinate point indicating a position which is shifted by the length of the assumed vector in a direction opposite to the direction of the assumed vector from the position of the second marker coordinate point as a base point. FIG. 13 is a diagram for explaining a process of calculating the other marker coordinate point in the third calculation process. In the example of FIG. 13, it is assumed that the coordinates of the position of the point p7 have already been determined as the first marker coordinate point. In this case, the second marker coordinate point which is the other marker coordinate point is calculated as a coordinate point indicating the position of a point p9. Note that the point p9 is a position of the end point of the assumed vector when the position of the start point of the corrected assumed vector is assumed to be the point p7. Note that, in the example of FIG. 13, when the point p7 is assumed to be the second marker coordinate point, the position of the first marker coordinate point is the position of the start point of the assumed vector where the position of the end point of the corrected assumed vector is assumed to be the point p7.

In the third calculation process, after a first marker coordinate point is selected from detected coordinate points, a second marker coordinate point is calculated using the assumed vector. As has been described concerning the second calculation process, by using the assumed vector, the second marker coordinate point can be calculated, taking into consideration an actual tilt of the controller 7. Therefore, according to the third calculation process, even when the number of detected coordinate points is one, a direction connecting two marker coordinate points can be correctly calculated. In addition, in the third calculation process, by setting the length of the assumed vector to be a length between most recently calculated marker coordinate points, the length between the two marker coordinate points becomes equal to the length between the previous marker coordinate points. As has been described concerning the first calculation process, it is considered that the amount of a change in the length of a vector connecting two marker coordinate points while a process of calculating the two marker coordinate points is performed one time, is small. Therefore, according to the third calculation process, even when the number of detected coordinate points is one, the length connecting two marker coordinate points can be determined with a small range of error. In other words, according to the third calculation process, even when the number of detected coordinate points is one, two marker coordinate points can be calculated. In addition, even when the number of detected coordinate points is two or more and the reliability of a result of calculation is low, valid marker coordinate points can be calculated by the third calculation process.

Figure 14:
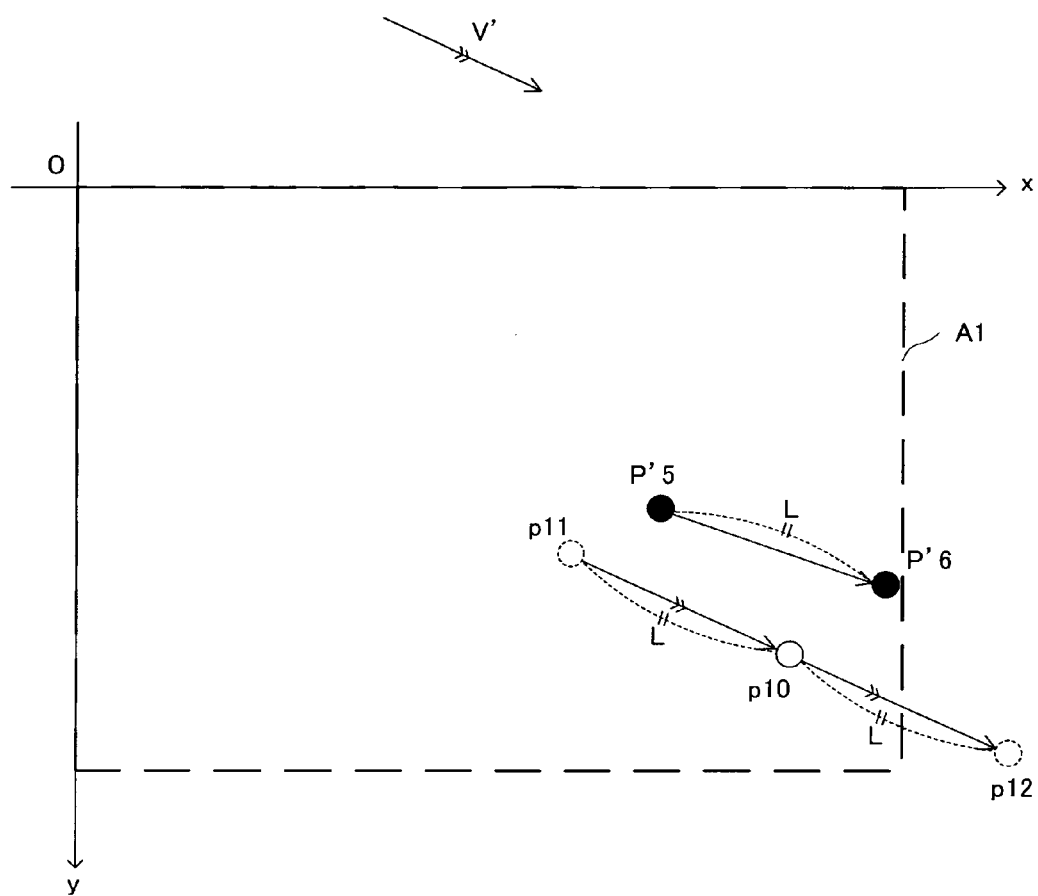
FIG. 14 is a diagram for explaining a fourth calculation process.

Next, the fourth calculation process will be described. The fourth calculation process is a process which can be used when the number of detected coordinate points is only one, and in which, assuming that the detected coordinate point is one of the marker coordinate points, the other marker coordinate point is calculated from the detected coordinate point. FIG. 14 is a diagram for explaining the fourth calculation process. In FIG. 14, a point p10 indicates the position of a currently detected coordinate point. In FIG. 14, a point P'5 and a point P'6 indicates the positions of latest marker coordinate points. Specifically, the point P'5 corresponds to a first marker coordinate point, and the point P' 6 corresponds to a second marker coordinate point. Here, the latest marker coordinate point refers to a marker coordinate point which is most recently calculated. For example, when calculation of a marker coordinate point fails in the previous marker coordinate point calculation process, the previous but one marker coordinate point is the latest marker coordinate point. In FIG. 14, a vector V' indicated outside the coordinate area of the xy coordinate system, is an assumed vector. In the fourth calculation process, the assumed vector is calculated based on the previous marker coordinate points and the output of the acceleration sensor 37, as in the third calculation process.

In the fourth calculation process, initially, assuming that the detected coordinate point is one of the marker coordinate points, the game apparatus 3 calculates a coordinate point which can be the other marker coordinate point. Here, the coordinate point is referred to as a "temporary coordinate point". The temporary coordinate point can be calculated based on the assumed vector and the detected coordinate point. The assumed vector used here is a vector whose length is a length between the latest marker coordinate points. Specifically, the game apparatus 3 calculates two temporary coordinate points. A first temporary coordinate point is a coordinate point indicating a position which is shifted by the length of the assumed vector in the direction of the assumed vector from the position of the detected coordinate point as a base point. A second temporary coordinate point is a coordinate point indicating a position which is shifted by the length of the assumed vector in a direction opposite to the direction of the assumed vector from the position of the detected coordinate point as a base point. In the example of FIG. 14, when the coordinates of the position of the point p10 are the detected coordinate points, the two temporary coordinate points are a coordinate point indicating the position of the point p11 and a coordinate point indicating the position of the point p12.

Note that the point p12 is the position of the end point of the assumed vector when assuming that the position of the start point of the assumed vector is the point p10, and the point p11 is the position of the start point of the assumed vector when assuming that the position of the end point of the assumed vector is the point p10. Note that, as illustrated in FIG. 14, although a temporary coordinate point may be present outside the area A1 of the captured image, the position outside the area A1 only takes coordinate values outside the range of (0, 0) to (1024, 768). Therefore, even the position outside the area A1 can be represented with the xy coordinate system.

Figure 15A:
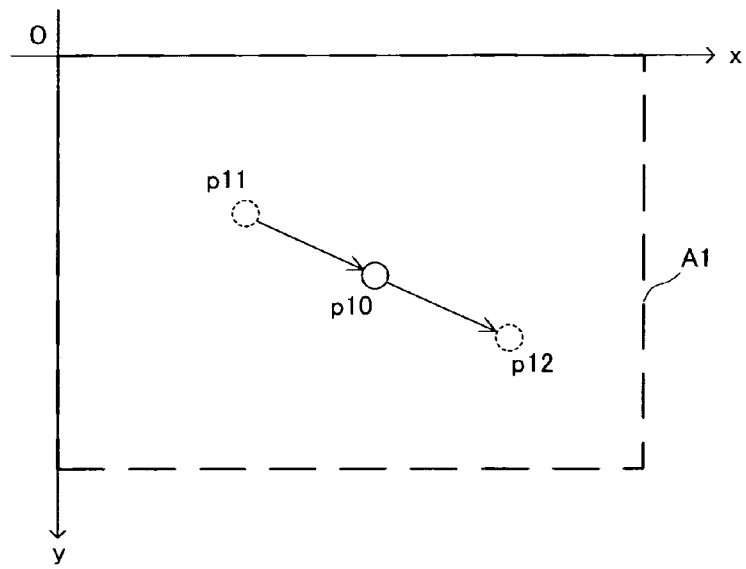
FIG. 15A is a diagram for explaining the fourth calculation process.
Figure 15B:
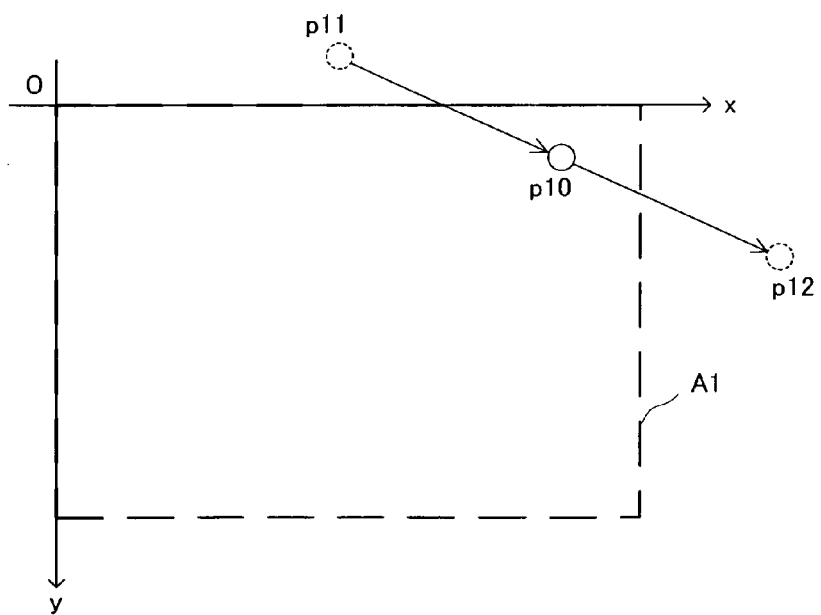
FIG. 15B is a diagram for explaining the fourth calculation process.

After the two temporary coordinate points are calculated, the game apparatus 3 determines whether or not the two temporary coordinate points are valid marker coordinate points. Specifically, when only one of the two temporary coordinate points is present outside the area A1, the temporary coordinate point indicating a position outside the area A1 is determined to be a marker coordinate point. This is because a valid reason why the number of detected coordinate points is one is considered to be that the other marker is present outside the area. Here, if a marker is inside the area, the marker is assumed to be detected, and a temporary coordinate point inside the area is not assumed to be a marker coordinate point. Note that, as illustrated in FIG. 15A, when the two temporary coordinate points are both positioned inside the area A1, the two temporary coordinate points are both determined not to be marker coordinate points. This is because it is not possible to determine which marker is a valid marker, and as described above, it is considered that if a marker is inside the area, the marker is detected. Also, as illustrated in FIG. 15B, when the two temporary coordinate points are both positioned outside the area A1, it is not possible to determine which marker is a valid marker, and therefore, the two temporary coordinate points are both determined not to be marker coordinate points. Note that, when the two temporary coordinate points are both determined not to be marker coordinate points, recognition of a marker coordinate point fails.

In the fourth calculation process, assuming that a detected coordinate point is a first marker coordinate point, a second marker coordinate point is calculated using an assumed vector. Therefore, according to the fourth calculation process, even when the number of detected coordinate points is one, a length connecting the two marker coordinate points can be determined with a small range of error. In other words, according to the fourth calculation process, even when the number of detected coordinate points is one, the two marker coordinate points can be calculated.

The third calculation process and the fourth calculation process are processes which are performed for the purpose of calculation of two marker coordinate points when the number of detected coordinate points is one. Here, whereas a current marker coordinate point is calculated using the previous marker coordinate points in the third calculation process, a current marker coordinate point is calculated using the latest marker coordinate points in the fourth calculation process. This is a difference between the third and fourth calculation processes. Therefore, when the previous marker coordinate points have been calculated, the third calculation process in which a marker coordinate point can be more certainly calculated is used. When the previous marker coordinate points have not been calculated, the fourth calculation process in which a current marker coordinate point can be calculated without using the previous marker coordinate points is used.

After two marker coordinate points are calculated in this manner, the game apparatus 3 uses the two marker coordinate points to determine an operation state of the controller 7 (the pointed position, a tilt of the controller 7, and a distance from the controller 7 to each of the markers 8a and 8b) as a game operation, and performs a game process corresponding to the game operation. Specifically, using the two marker coordinate points, the game apparatus 3 can calculate the pointed position, a rotation angle (attitude) of the controller 7 from a pointing direction thereof as an axis, and the distance from the controller 7 to each of the markers 8a and 8b.

Figure 16:
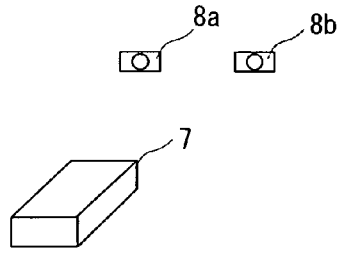
FIG. 16 is a diagram illustrating a change in a captured image when a position and/or an orientation of the controller 7 are changed.

FIG. 16 is a diagram illustrating a change in captured images when the position and/or orientation of the controller 7 are changed. FIG. 16 illustrates a correspondence between a state of the controller 7 and a captured image obtained in such a state. In FIG. 16, when the controller 7 is in a state A, the position of a first marker coordinate point is the position of a point p'1, and the position of a second marker coordinate point is the position of a point p'2. In this case, the positions of the two marker coordinate points are substantially parallel to the x-axis direction.

A state B illustrated in FIG. 16 is such that the controller 7 is rotated by 90° from the state A clockwise around a pointing direction thereof as an axis (around the Z axis). Note that the terms "clockwise" and "anticlockwise" with respect to the controller 7 hereinafter refer to rotational directions as viewed from the rear of the controller 7 (the negative direction side of the Z axis of FIGS. 3A and 3B). In the state B, the position of each marker coordinate point is rotated by 90° anticlockwise from the state A. Therefore, by determining a direction connecting the two marker coordinate points (e.g., a direction from the first marker coordinate point to the second marker coordinate point), a tilt (attitude) of the controller 7 from the pointing direction as an axis can be found.

A state C illustrated in FIG. 16 is such that the controller 7 is translated toward a right direction (the positive direction of the X axis) where the state A is a reference. In the state C, the position of each marker coordinate point is translated toward a left direction (the negative direction of the x axis) where the state A is a reference. Note that the state C is such that the pointing direction of the controller 7 is turned to the right direction from the state A. Here, in addition to the case where the controller 7 is translated toward the right direction, the pointing direction of the controller 7 can be turned to the right direction by rotating the controller 7 around the Y axis. When the controller 7 is rotated around the Y axis, marker coordinate points substantially the same as those of the state C are obtained. Thus, when the controller 7 is shifted or rotated so that the pointing direction of the controller 7 is turned to the right direction, marker coordinate points substantially the same as those of the state C are obtained. Therefore, by detecting the positions of the two marker coordinate points, the pointed position of the controller 7 can be found.

A state D illustrated in FIG. 16 is such that the controller 7 is moved away from each of the markers 8a and 8b (i.e., translated in a backward direction) where the state A is a reference. In the state D, a distance from a first marker coordinate point to a second marker coordinate point is shorter than in the state A. Therefore, by detecting the distance from the first marker coordinate point to the second marker coordinate point, a shifted state concerning the pointing direction of the controller 7 (distances between the controller 7 and the markers 8a and 8b) can be found.

As described above, by calculating two marker coordinate points, the game apparatus 3 can find the shifted state or the rotated state of the controller 7, and the shifted state or the rotated state of the controller 7 can be used as a game operation. Note that, in this embodiment, any game process which employs the marker coordinate points as a game operation may be performed. As an exemplary game process, a player's character appearing in a game space may be moved, depending on the positions of the two marker coordinate points.

As described above, according to this embodiment, even when the number of detected coordinate points is one or three or more, two marker coordinate points can be correctly calculated. In addition, even when the number of detected coordinate points is three or more, the marker coordinate points can be calculated, and no problems occurs even if an image having the same color as that of a marker is displayed on the monitor screen, whereby display contents on the screen are not limited, which is different from conventional technology. Even when the number of detected coordinates is one, a marker coordinate point can be calculated, whereby the player can move the controller 7 in a wide range, and the degree of freedom of an operation which moves the controller 7 itself can be improved.

Figure 17:
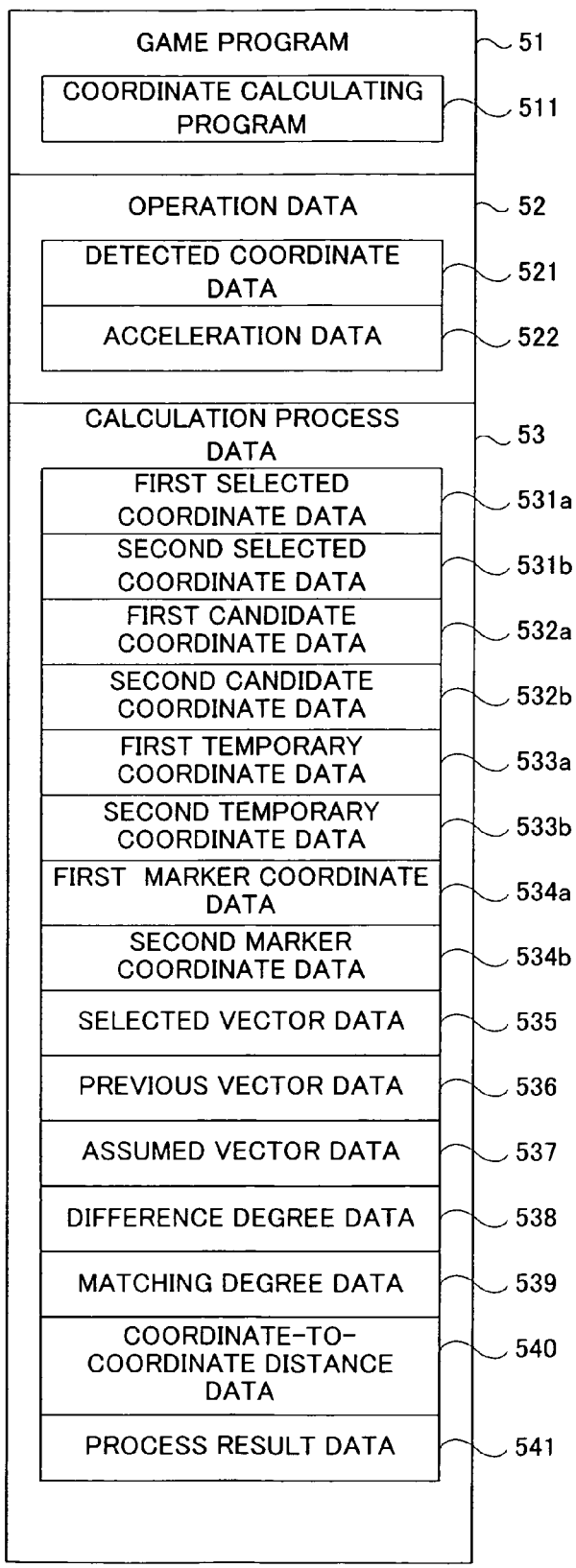
FIG. 17 is a diagram illustrating main data stored in a main memory 13 of the game apparatus 3.

Next, a game process performed in the game apparatus 3 will be described in detail. Firstly, main data used in the game process will be described with reference to FIG. 17. FIG. 17 is a diagram illustrating the main data stored in the main memory 13 of the game apparatus 3. As illustrated in FIG. 17, the main memory 13 stores a game program 51, an operation data 52, calculation process data 53, and the like. Note that the main memory 13 stores, in addition to the data of FIG. 17, data required for the game process, such as image data of a character appearing in a game, data indicating various parameters of the character, and the like.

The whole or a part of the game program 51 is read from the optical disc 4 and stored into the main memory 13 with appropriate timing after the game apparatus 3 is powered ON. The game program 51 includes a coordinate calculating program 511. The coordinate calculating program 511 is a program for performing a process of calculating a marker coordinate point(s) using a detected coordinate point(s) (the first to fourth calculation processes). The game program 51 includes a program required for executing the game process in addition to the coordinate calculating program 511.

The operation data 52 is transmitted from the controller 7 to the game apparatus 3, and is stored into the main memory 13. The operation data 52 includes detected coordinate data 521 and acceleration data 522. The detected coordinate data 521 is data indicating a coordinate point detected by the image processing circuit 41. As described above, since the number of detected coordinate points is not fixed, the detected coordinate data 521 may indicate a plurality of detected coordinate points or only one detected coordinate point, or no detected coordinate point. The acceleration data 522 is data indicating an acceleration detected by the acceleration sensor 37. Here, the acceleration data 522 is data indicating accelerations concerning directions of the X, Y, and Z axes (three axes) of FIGS. 3A and 3B. In other words, the acceleration data 522 is data that can be used to determine attitude of the controller 7. The detected coordinate data and the acceleration data are contained in the operation data transmitted from the controller 7 to the game apparatus 3.

The calculation process data 53 is data used in a process of calculating a marker coordinate point(s) (the first to fourth calculation processes). The calculation process data 53 includes first and second selected coordinate data 531a and 531b, first and second candidate coordinate data 532a and 532b, first and second temporary coordinate data 533a and 533b, first and second marker coordinate data 534a and 534b, selected vector data 535, previous vector data 536, assumed vector data 537, difference degree data 538, matching degree data 539, coordinate point-to-coordinate point distance data 540, and process result data 541.

The first and second selected coordinate data 531a and 531b indicate coordinate points selected as objects to be processed from detected coordinate points (selected coordinate points) in the first to fourth calculation processes. In the calculation process, two coordinate points are selected from the detected coordinate points at once. Therefore, data of one of the two coordinate points is assumed to be the first selected coordinate data 531a and data of the other coordinate point is assumed to be the second selected coordinate data 531b. The first and second candidate coordinate data 532a and 532b indicate coordinate points which are candidates for marker coordinate points among the detected coordinate points. Hereinafter, the coordinate points are referred to as candidate coordinate points. Here, the first candidate coordinate data 532a indicates a coordinate point which is a candidate for a first marker coordinate point, and this coordinate point is referred to as a first candidate coordinate point. The second candidate coordinate data 532b indicates a coordinate point which is a candidate for a second marker coordinate point, and this coordinate point is referred to as a second candidate coordinate point. The temporary coordinate data 533a and 533b indicate the above-described temporary coordinate points used in the fourth calculation process. Since two temporary coordinate points are calculated at once in the fourth calculation process, data of one of the two temporary coordinate points is assumed to be the first temporary coordinate data 533a, and data of the other temporary coordinate point is assumed to be the second temporary coordinate data 533b. The first marker coordinate data 534a indicates a first marker coordinate point, and the second marker coordinate data 534b indicates a second marker coordinate point. In this embodiment, as a result of the first to fourth calculation processes, each marker coordinate data is stored into the main memory 13, and the marker coordinate data is used in the game process. Note that, in other embodiments, data indicating a vector connecting a first marker coordinate point and a second marker coordinate point may be stored instead of the first marker coordinate data 534a and the second marker coordinate data 534b. For example, data indicating the coordinates of the start point of a vector (the first marker coordinate point) and data indicating the direction and length of the vector may be stored in the main memory 13.

The selected vector data 535 indicates a selected vector whose start point is a first selected coordinate point and whose end point is a second selected coordinate point. The previous vector data 536 indicates the above-described previous vector. The assumed vector data 537 indicates the above-described assumed vector. The difference degree data 538 is used in the first calculation process, and indicates a smallest value of the degree of a difference between each selected vector and the previous vector. The matching degree data 539 is used in the second calculation process, and indicates a largest value of the degree of a match between each selected vector and the assumed vector. The coordinate point-to-coordinate point distance data 540 is used in the third calculation process, and indicates a smallest value of a distance between each selected coordinate point and each of the previous marker coordinate points. Note that the difference degree data 538 and the matching degree data 539 are different data since they are used in the different processes, and therefore, the difference in the data contents (the degree of a difference and the degree of a match) is for the sake of convenience. Instead of this, any one of the smallest value of the difference degree and the largest value of the matching degree may be used as long as it is used in a process of selecting a closet coordinate point. The process result data 541 indicates which of the first to fourth calculation processes the previous marker coordinate calculation process is.

Figure 18:
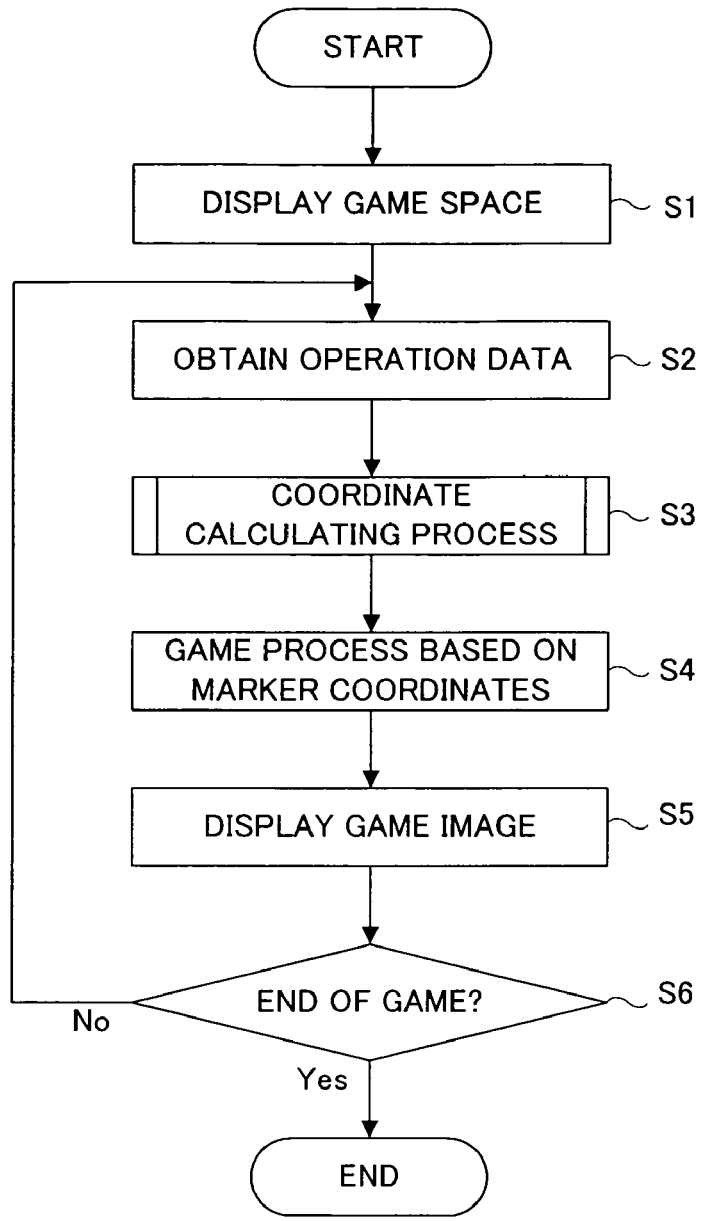
FIG. 18 is a flowchart illustrating a flow of a game process executed in the game apparatus 3.

Next, a game process performed in the game apparatus 3 will be described in detail with reference to FIGS. 18 to 26. FIG. 18 is a flowchart illustrating a flow of the game process performed in the game apparatus 3. When the game apparatus 3 is powered ON, the CPU 10 of the game apparatus 3 executes a start-up program stored in a boot ROM (not shown), thereby initializing each unit, such as the main memory 13 or the like. Thereafter, a game program stored in the optical disc 4 is read into the main memory 13, which is in turn executed by the CPU 10. The flowchart of FIG. 18 illustrates a game process which is performed after completion of the above-described process. Note that, in the flowchart of FIG. 18, in the game process, a process of calculating a marker coordinate point from a coordinate point detected by the controller 7 will be described in detail, but other game processes which are not directly involved with the present invention will not be described in detail.

Initially, in step S1, a game space is constructed and is displayed on the monitor 2. For example, the CPU 10 constructs a three-dimensional game space (may be two-dimensional), and further places an object which appears in the game space, at a predetermined initial position. A game image representing the game space thus constructed is generated, and the generated game image is displayed on the monitor 2. Thereafter, a process loop of steps S2 to S6 is repeated per frame, whereby the game proceeds.

In step S2, the CPU 10 obtains operation data from the controller 7. Specifically, the controller 7 transmits operation data to the game apparatus 3 at predetermined time intervals (e.g., one-frame time intervals), and therefore, the CPU 10 stores the transmitted operation data into the main memory 13. When the operation data includes detected coordinate data, the CPU 10 stores the detected coordinate data into the main memory 13. When the operation data includes acceleration data, the CPU 10 stores the acceleration data into the main memory 13. Note that the operation data may include data indicating an operation performed with respect to the operation section 32, in addition to the detected coordinate data and the acceleration data.

In the following step S3, the CPU 10 executes the coordinate calculating program 511, thereby executing a coordinate calculation process. In the coordinate calculation process, a marker coordinate point(s) is calculated based on the operation data obtained in step S2. Hereinafter, the coordinate calculation process will be described in detail with reference to FIGS. 19 to 26.

Figure 19:
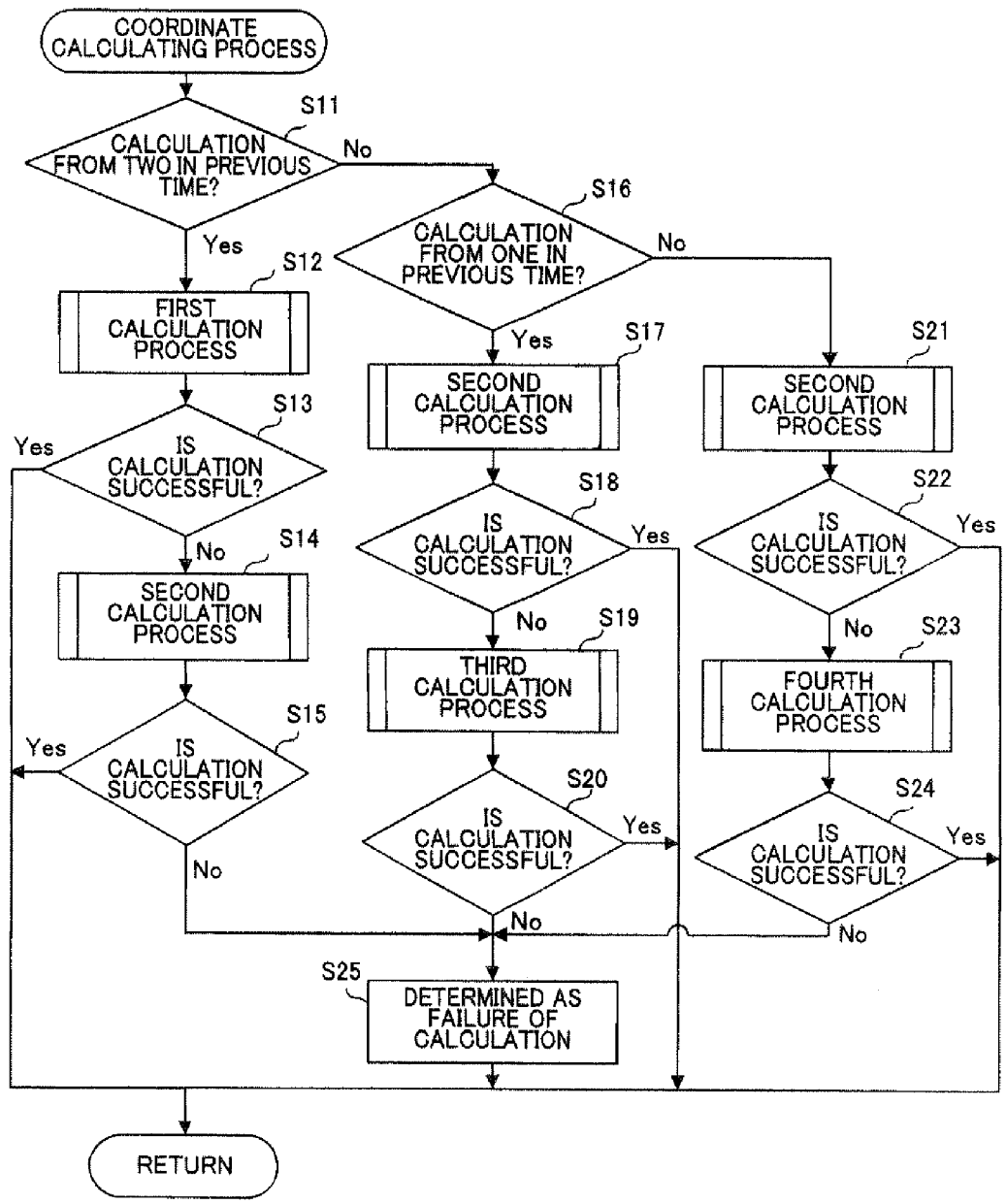
FIG. 19 is a flowchart illustrating details of a coordinate calculation process in step S3 of FIG. 18.

FIG. 19 is a flowchart illustrating details of the coordinate calculation process in step S3 of FIG. 18. In the coordinate calculation process, in step S11, it is determined whether or not marker coordinate points have been calculated from two detected coordinate points in the previous coordinate calculation process. Specifically, it is determined whether or not marker coordinate points have been calculated by the first calculation process or the second calculation process in the previous coordinate calculation process. Note that the CPU 10 can determine which of the first to fourth calculation processes has been used to calculate a marker coordinate point(s) in the previous coordinate calculation process, by referencing the process result data 541 stored in the main memory 13. Note that, when marker coordinate points have not been able to be calculated in the previous coordinate calculation process, the result of step S11 is negative. When the result of step S11 is positive, a process of step S12 is executed. On the other hand, when the result of step S11 is negative, a process of step S16 is executed.

Figure 20:
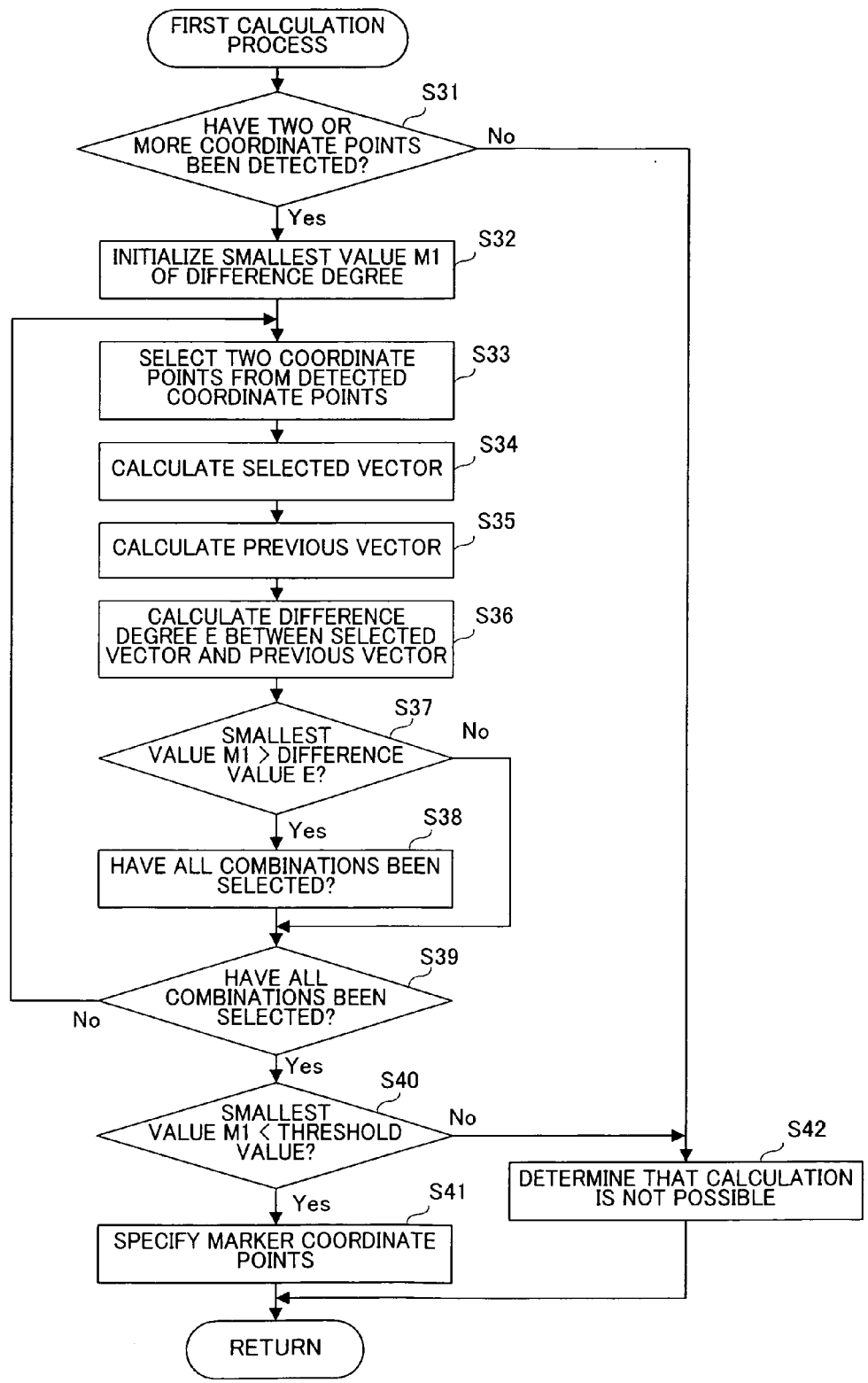
FIG. 20 is a flowchart illustrating details of a first calculation process in step S12 of FIG. 19.

In step S12, the first calculation process is executed. FIG. 20 is a flowchart illustrating details of the first calculation process in step S12 of FIG. 19. In the first calculation process, in step S31, it is determined whether or not the controller 7 has detected two or more coordinate points. The determination in step S31 is performed, depending on whether or not the number of detected coordinate points is two or more, i.e., whether or not the detected coordinate data 521 included in operation data stored in the main memory 13 indicates two or more detected coordinate points. When the result of the determination in step S31 is positive, a process of step S32 is executed. On the other hand, when the result of the determination in step S31 is negative, a process of step S42 is executed. In this case, marker coordinate points are not calculated by the first calculation process. This is because the first calculation process is a process which uses two or more detected coordinate points to calculate marker coordinate points.

In step S32, a smallest value M1 of the degree of a difference between a selected vector described below and the previous vector, is initialized. Specifically, the CPU 10 updates contents of the difference degree data 538 stored in the main memory 13 to data indicating a predetermined value. Note that the predetermined value is sufficiently large, and specifically, is larger than a threshold value used in step S40 described below. Following step S32, a process of step S33 is executed.

In step S33, the CPU 10 selects two coordinate points from the detected coordinate points. Specifically, among the two or more detected coordinate points, one coordinate point is selected as a first selected coordinate point, and a coordinate point other than that which is selected as the first selected coordinate point is selected as a second selected coordinate point. In this case, the CPU 10 stores data indicating the coordinate point selected as the first selected coordinate point, as the first selected coordinate data 531a, into the main memory 13, and data indicating the coordinate point selected as the second selected coordinate point, as the second selected coordinate data 531b, into the main memory 13.

Note that, in other embodiments, the image processing circuit 41 of the controller 7 may detect a size of an area corresponding to a detected coordinate point in addition to the detected coordinate point, and the operation data may include data indicating the size. In this case, in step S33, the size of the area corresponding to the detected coordinate point may be used to select only a combination of detected coordinate points having substantially the same size. Thereby, a process of selecting an unnecessary combination can be omitted.

In the following step S34, a selected vector whose start point is the first selected coordinate point and whose end point is the second selected coordinate point is calculated. The CPU 10 calculates the selected vector based on the first selected coordinate data 531a and the second selected coordinate data 531b stored in the main memory 13. Data indicating the selected vector thus calculated is stored as the selected vector data 535 into the main memory 13.

In the following step S35, the previous vector is calculated. The previous vector refers to a vector whose start point is the previous first marker coordinate point and whose end point is the previous second marker coordinate point as described above. Here, the previous first and second marker coordinate points can be found by referencing the marker coordinate data 534a and 534b stored in the main memory 13, respectively. The CPU 10 calculates the previous vector based on the marker coordinate data 534a and 534b. Data indicating the previous vector thus calculated is stored as the previous vector data 536 into the main memory 13.

In the following step S36, a degree of a difference between the selected vector and the previous vector (difference degree e) is calculated. Specifically, the CPU 10 calculates a first difference degree v between the direction of the selected vector and the direction of the previous vector. In this embodiment, the first difference degree v is obtained by calculating an inner product value of the selected vector and the previous vector which are each normalized into a unit vector having a length of 1. The inner product value is decreased with an increase in a difference between the directions of vectors. Therefore, the first difference degree v is set so that it takes a larger value as the difference in direction is increased (i.e., as the inner product value is decreased). Next, the CPU 10 calculates a second difference degree w between the length of the selected vector and the length of the previous vector. In this embodiment, the second difference degree w is obtained by calculating the length of a vector of a difference between the selected vector and the previous vector. The larger the difference, the more the second difference degree w. The second difference degree w represents a degree of a difference in vector length, and therefore, may be calculated based on, for example, a ratio of vector lengths in addition to the difference. Next, the CPU 10 adds the first difference degree v with the second difference degree w to obtain the difference degree e. Note that the difference degree e may be calculated by any method in addition to the above-described method as long as the difference degree e takes a larger value as the difference between the selected vector and the previous vector is increased.

In the following step S37, it is determined whether or not the smallest value M1 of the current difference degree is larger than the difference degree e calculated in step S36. Note that the CPU 10 can find the smallest value M1 of the current difference degree by referencing the difference degree data 538 stored in the main memory 13. When the result of the determination in step S37 is positive, a process of step S38 is executed. On the other hand, when the result of the determination in step S37 is negative, the process of step S38 is skipped and a process of step S39 is executed.

In step S38, the current selected coordinate point is set as a candidate coordinate point. Specifically, the CPU 10 updates contents of the first candidate coordinate data 532a stored in the main memory 13 with contents of the first selected coordinate data 531a stored in the main memory 13, and contents of the second candidate coordinate data 532b stored in the main memory 13 with contents of the second selected coordinate data 531b stored in the main memory 13. Also, contents of the difference degree data 538 stored in the main memory 13 are updated with contents indicating the difference degree e calculated in step S36. By the process of step S38, the first selected coordinate point and the second selected coordinate point which constitute a selected vector most similar to the previous vector among the vectors selected in the process loop of steps S33 to S39 are set as a first candidate coordinate point and a second candidate coordinate point. Following step S38, the process of step S39 is executed.

In step S39, concerning combinations of the first selected coordinate point and the second selected coordinate point selected from two or more detected coordinate points, it is determined whether or not all the combinations have been selected in step S33. Note that, here, a combination of a certain coordinate point A as a first selected coordinate point and a certain coordinate B as a second selected coordinate point, is considered to be different from a combination of the coordinate B as a first selected coordinate point and the coordinate A as a second selected coordinate point. When the result of the determination in step S39 is positive, a process of step S40 is executed. On the other hand, when the result of the determination in step S39 is negative, processes in and after step S33 are performed again with respect to other combinations, and subsequently, the processes of steps S33 to S39 are repeated until all the combinations are selected.

In step S40, it is determined whether or not the smallest value M1 of the current difference degree is smaller than a predetermined threshold value. Specifically, the CPU 10 determines whether or not the smallest value M1 indicated by the difference degree data 538 stored in the main memory 13 is smaller than the threshold value. When the result of the determination in step S40 is positive, a process of step S41 is executed. On the other hand, when the result of the determination in step S40 is negative, the process of step S42 is executed.

In step S41, each candidate coordinate point currently set is determined as a marker coordinate point. Specifically, a coordinate which is set as a current first candidate coordinate point is determined as a first marker coordinate point, and a coordinate point which is set as a current second candidate coordinate point is determined as a second marker coordinate point. Specifically, the CPU 10 updates contents of the first marker coordinate data 534a stored in the main memory 13 with the contents of the first candidate coordinate data 532a stored in the main memory 13, and contents of the second marker coordinate data 534b stored in the main memory 13 with the contents of the second candidate coordinate data 532b stored in the main memory 13. Thereby, each marker coordinate point is calculated in the first calculation process. Note that, in step S41, the CPU 10 updates contents of the process result data 541 stored in the main memory 13 with contents indicating the first calculation process. After the end of step S41, the CPU 10 ends the first calculation process.

On the other hand, in step S42, it is determined that it is not possible to calculate marker coordinate points in the first calculation process. In this embodiment, when the smallest value M1 of the current difference degree is larger than or equal to the above-described threshold value, it is determined that it is not possible to calculate marker coordinate points. This is because, when the smallest value Ml of the current difference degree is larger than or equal to the threshold value, it is considered that no selected vectors are similar to the previous vector, and if marker coordinate points are determined in such a case, correct marker coordinate points are unlikely to be obtained. For example, when noise is included in a captured image and at least one of the markers is present outside the area, the result of the calculation is not valid even if a calculation process is performed from the detected coordinate points. In other words, in this embodiment, by performing the determination of step S40, incorrect marker coordinate points are prevented from being calculated. After the end of step S42, the CPU 10 ends the first calculation process.

Referring back to FIG. 19, in step S13 following step S12, it is determined whether or not marker coordinate points have been calculated in the first calculation process. Specifically, when step S41 of the first calculation process has been executed, the result of the determination in step S13 is positive. On the other hand, when step S42 has been executed, the result of the determination in step S13 is negative. When the result of the determination in step S13 is positive, the CPU 10 ends the coordinate calculation process of FIG. 19. On the other hand, when the result of the determination in step S13 is negative, a process of step S14 is executed.

Figure 21:
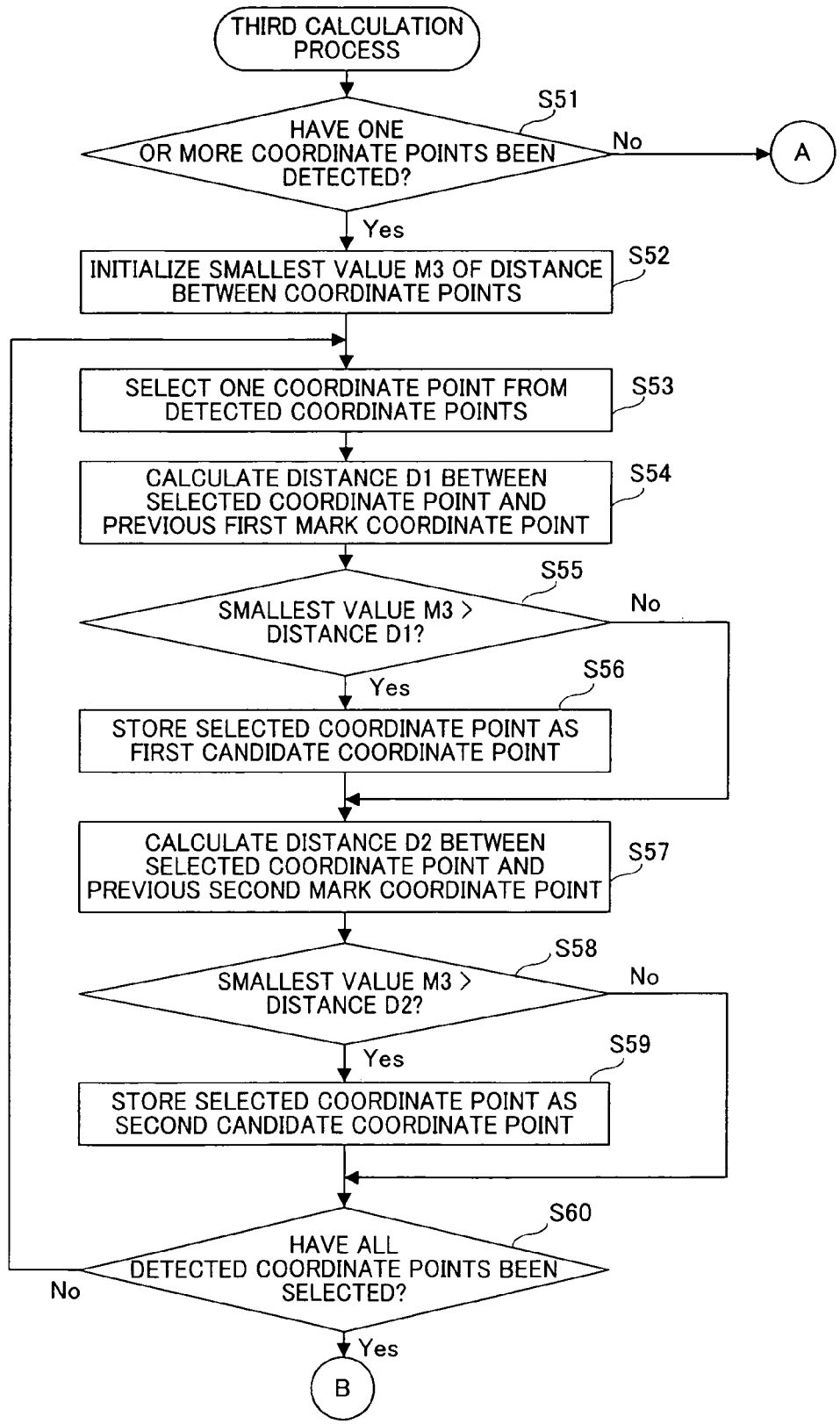
FIG. 21 is a flowchart illustrating details of a third calculation process in step S14 of FIG. 19.
Figure 22:
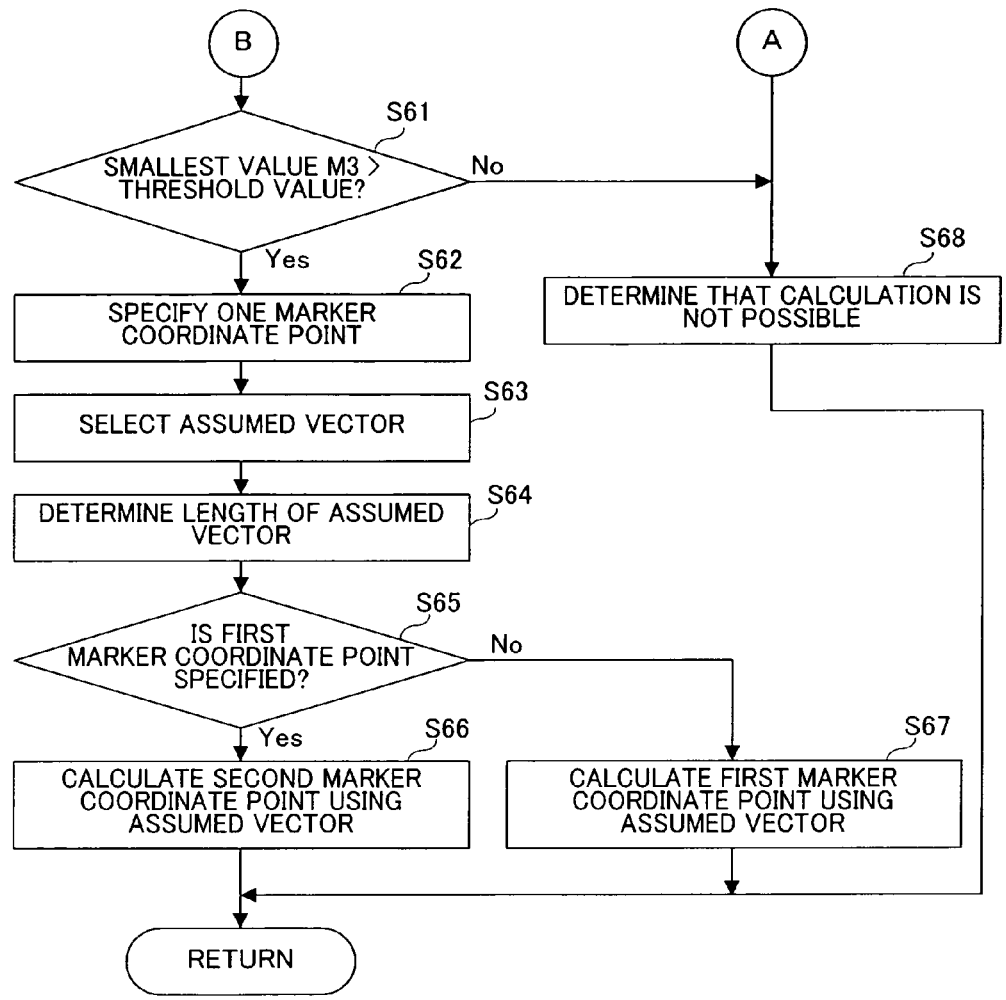
FIG. 22 is a flowchart illustrating details of the third calculation process in step S14 of FIG. 19.

In step S14, the third calculation process is executed. FIGS. 21 and 22 are flowcharts illustrating details of the third calculation process in step S14 of FIG. 19. In the third calculation process, in step S51, it is determined whether or not one or more coordinate points have been detected by the controller 7. The determination in step S51 is performed, depending on whether or not the number of detected coordinate points is one or more, i.e., whether or not the detected coordinate data 521 included in operation data stored in the main memory 13 indicates one or more detected coordinate points. When the result of the determination in step S51 is positive, a process of step S52 is executed. On the other hand, when the result of the determination in step S51 is negative, a process of step S68 is executed. In this case, a marker coordinate point is not calculated by the third calculation process. This is because the third calculation process is a process of calculating a marker coordinate point using one or more detected coordinate points.

In step S52, a smallest value M3 of a distance between the selected coordinate point and the previous marker coordinate point is initialized. Specifically, the CPU 10 updates contents of the coordinate point-to-coordinate point distance data 540 stored in the main memory 13 into data indicating a predetermined value. Note that this predetermined value is a sufficiently large value, and specifically, a value larger than a threshold value used in step S61 described below. The predetermined value and the threshold value used in the third calculation process are not related to the predetermined value and the threshold value used in the first calculation process. Following step S52, a process of step S53 is executed.

In step S53, the CPU 10 selects one of the detected coordinate points. In this case, the CPU 10 stores data indicating the selected coordinate point as the first selected coordinate data 531a into the main memory 13. Note that, since the number of selected coordinate points is only one in the third calculation process, the first selected coordinate point and the second selected coordinate point are not distinguished.

In the following step S54, a distance D1 between the selected coordinate point and the previous first marker coordinate point is calculated. Note that the previous first marker coordinate point can be found by referencing the first marker coordinate data 534a stored in the main memory 13. The CPU 10 calculates the distance D1 based on the first selected coordinate data 531a and the first marker coordinate data 534a stored in the main memory 13.

In the following step S55, it is determined whether or not the smallest value M3 of the current coordinate point-to-coordinate point distance is larger than the distance D1 calculated in step S54. Note that the CPU 10 can find the smallest value M3 of the current coordinate point-to-coordinate point distance by referencing the coordinate point-to-coordinate point distance data 540 stored in the main memory 13. When the result of the determination in step S55 is positive, a process of step S56 is executed. On the other hand, the result of the determination in step S55 is negative, the process of step S56 is skipped and a process of step S57 is executed.

In step S56, the current selected coordinate point is set as a first candidate coordinate point. Specifically, the CPU 10 updates contents of the first candidate coordinate data 532a stored in the main memory 13 with the contents of the first selected coordinate data 531a stored in the main memory 13. In this case, the second candidate coordinate data 532b stored in the main memory 13 is deleted. Also, the contents of the coordinate point-to-coordinate point distance data 540 stored in the main memory 13 are updated with contents indicating the distance D1 calculated in step S54. By the process of step S56, one of the coordinate points so far selected in a process loop of steps S53 to S60, that is closest to the previous marker coordinate point, is set as a first candidate coordinate point. Following step S56, a process of step S57 is executed.

In step S57, a distance D2 between the selected coordinate point and the previous second marker coordinate is calculated. Note that the previous second marker coordinate point can be found by referencing the second marker coordinate data 534b stored in the main memory 13. The CPU 10 calculates the distance D2 based on the first selected coordinate data 531a and the second marker coordinate data 534b stored in the main memory 13.

In the following step S58, it is determined whether or not the smallest value M3 of the current coordinate point-to-coordinate point distance is larger than the distance D2 calculated in step S57. Note that the CPU 10 can find the smallest value M3 of the current coordinate point-to-coordinate point distance by referencing the coordinate point-to-coordinate point distance data 540 stored in the main memory 13. When the result of the determination in step S58 is positive, a process of step S59 is executed. On the other hand, when the result of the determination in step S58 is negative, the process of step S59 is skipped and a process of step S60 is executed.

In step S59, the current selected coordinate point is set as a second candidate coordinate point. Specifically, the CPU 10 updates the contents of the second candidate coordinate data 532b stored in the main memory 13 with the contents of the first selected coordinate data 531a stored in the main memory 13. In this case, the first candidate coordinate data 532a stored in the main memory 13 is deleted. Also, the contents of the coordinate point-to-coordinate point distance data 540 stored in the main memory 13 are updated with contents indicating the distance D2 calculated in step S57. By the process of step S59, one of the coordinate points so far selected in a process loop of steps S53 to S60, that is closest to the previous marker coordinate point, is set as a second candidate coordinate point. Following step S59, the process of step S60 is executed.

In step S60, it is determined whether or not all of one or more detected coordinate points have been selected. When the result of the determination in step S60 is positive, a process of step S61 is executed. On the other hand, when the result of the determination in step S60 is negative, processes in and after step S53 are executed again for other detected coordinate points. Thereafter, the processes of steps S53 to S60 are repeated until all detected coordinate points are selected.

In step S61 illustrated in FIG. 22, it is determined whether or not the smallest value M3 of the current coordinate point-to-coordinate point distance is smaller than a predetermined threshold value. Specifically, the CPU 10 determines whether or not the smallest value M3 indicated by the coordinate point-to-coordinate point distance data 540 stored in the main memory 13 is smaller than the threshold value. When the result of the determination in step S61 is positive, a process of step S62 is executed. On the other hand, when the result of the determination in step S61 is negative, a process of step S68 is executed.

In step S62, one of the marker coordinate points is specified. Specifically, when a current first candidate coordinate point has been set, a coordinate point set as the first candidate coordinate point is determined as a first marker coordinate point, and when a current second candidate coordinate point has been set, a coordinate point set as the second candidate coordinate point is determined as a second marker coordinate point. Specifically, the CPU 10 updates the contents of the first marker coordinate data 534a stored in the main memory 13 with the contents of the first candidate coordinate data 532a stored in the main memory 13, or updates the contents of the second marker coordinate data 534b stored in the main memory 13 with the contents of the second candidate coordinate data 532b stored in the main memory 13.

In the following step S63, an assumed vector is calculated based on the acceleration data. Hereinafter, a method of calculating the assumed vector will be described with reference to FIGS. 23 and 24.

Figure 23:
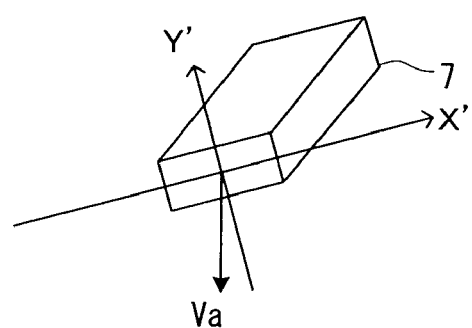
FIG. 23 is a diagram illustrating a positional relationship between the controller 7 and the markers 8a and 8b in a certain situation.
Figure 24:
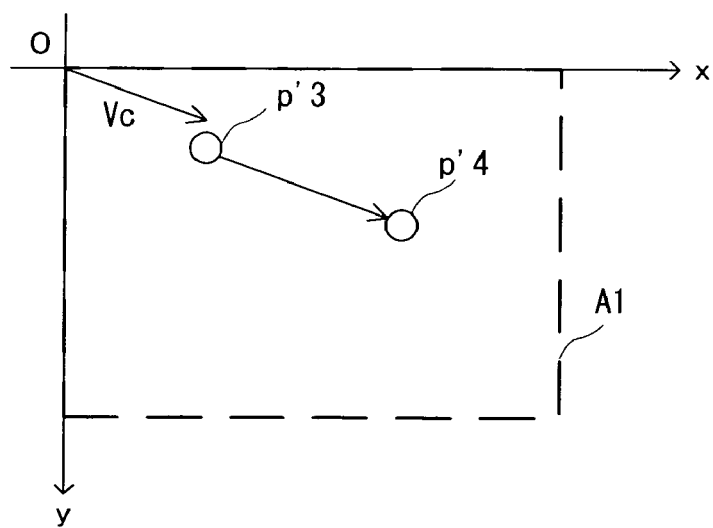
FIG. 24 is a diagram illustrating positions of marker coordinate points in the situation of FIG. 23.

FIG. 23 is a diagram illustrating a positional relationship between the controller 7 and the markers 8a and 8b in a certain state. FIG. 24 is a diagram illustrating the positions of marker coordinate points assumed in the state. In FIG. 23, the controller 7 is tilted concerning a rotation direction of the controller 7 around a pointing direction thereof as an axis. In this case, the acceleration sensor 37 detects and outputs a vector Va indicating a direction of a gravitational acceleration. Here, the vector Va is represented with a coordinate system composed of the X' axis whose positive direction is the right direction as viewed from the rear side of the controller 7 and the Y' axis whose positive direction is the up direction of the controller 7. The acceleration sensor 37 is assumed to output a vector pointing in the negative direction of the Y' axis when the controller 7 is in a horizontal state. Note that the acceleration sensor 37 may also detect an acceleration of the Z'-axis component perpendicular to the X' axis and the Y' axis, however, in this embodiment, the Z'-axis component acceleration is not required and is omitted. The vector Va is represented by (va1, va2) in the X'Y' coordinate system. On the other hand, in the state of FIG. 23, the direction of a vector Vc having the same direction as that of a vector whose start point is a first marker coordinate point and whose end point is a second marker coordinate point is considered to be one illustrated in FIG. 24.

Here, in this embodiment, it is assumed that the two markers 8a and 8b are horizontally arranged. In addition, as described above, the acceleration sensor 37 is assumed to output a vector directing the negative direction of the Y' axis when the controller 7 is in the horizontal state. Therefore, when the vector Va output from the acceleration sensor 37 points in the negative direction of the Y' axis, the vector Vc connecting the marker coordinate points in the positive direction of the x axis. In other words, the vector Va pointing in the negative direction of the Y' axis corresponds to the vector Vc pointing the positive direction of the x axis. Based on this correspondence relationship, the vector Vc connecting the marker coordinate points can be calculated from the vector Va output from the acceleration sensor 37. Specifically, the vector Vc=(vc1, vc2) can be calculated from the vector Va indicating the acceleration using the following expression.

$vc1 = -va2$ $vc2 = -va1$

The direction of the assumed vector can be obtained by normalizing the vector Vc obtained by the above-described expression into a unit vector.

Although the vector Vc is calculated using the above-described expression due to the above-described correspondence relationship in this embodiment, the expression for calculating the vector Vc needs to be changed if the correspondence relationship changes. Note that, in other embodiments, the player may change the correspondence relationship. Specifically, the player performs a predetermined operation (e.g., an operation of pushing down an operation button, etc.) while holding the controller 7 at an arbitrary tilt. The game apparatus 3 calculates marker coordinate points from an image captured at the time when the operation is performed, and calculates a vector Vc' having the direction of a vector connecting the marker coordinate points. Further, the game apparatus 3 stores a correspondence relationship between the directions of the vectors Va' and Vc' output from the acceleration sensor 37. After the correspondence relationship is stored, the game apparatus 3 calculates a difference between the direction of the vector Va output from the acceleration sensor 37 and the vector Va' included in the correspondence relationship, and calculates the vector Vc corresponding to the vector Va by rotating Vc' by the difference.

Note that the method of calculating an assumed vector illustrated in FIGS. 23 and 24 is only for illustrative purposes. Any method of calculating an assumed vector may be used as long as an assumed vector indicating a direction connecting two marker coordinate points when the controller 7 has an arbitrary attitude can be calculated from the attitude of the controller 7 (the image capturing element 40).

Referring back to FIG. 22, in step S63, an assumed vector is calculated using the above-described method. The CPU 10 stores data indicating the assumed vector thus calculated, as the assumed vector data 537, into the main memory 13.

In the following step S64, the length of the assumed vector is determined. Specifically, the CPU 10 determines the length of the assumed vector so that it is a length between the most recently calculated marker coordinate points. The length of the assumed vector can be calculated based on the marker coordinate data 534a and 534b stored in the main memory 13. After determining the length of the assumed vector, the CPU 10 stores data indicating the assumed vector, as the assumed vector data 537, into the main memory 13.

Note that, in other embodiments, the image processing circuit 41 of the controller 7 may detect a size of an area corresponding to a detected coordinate point in addition to the detected coordinate point, and operation data may include data indicating the size. In this case, in step S64, based on the size of the area corresponding to the detected coordinate point (specifically, a detected coordinate point specified as a marker coordinate point in step S62), a length between marker coordinate points is estimated, and the length of the assumed vector may be corrected into the estimated length. In other words, if the area corresponding to the detected coordinate point is large, it is expected that the distance between the marker coordinate points is large, and therefore, the distance between the marker coordinate points can be estimated based on the size of the area.

Also, in step S64, the CPU 10 may correct the assumed vector so that the assumed vector has a predetermined length. For example, in a situation that a distance from the controller 7 to the markers 8a and 8b is substantially constant, the assumed vector can be simply and correctly corrected by correcting the assumed vector so that the assumed vector have the predetermined length.

In the following step S65, it is determined whether or not the marker coordinate point which has already been specified in step S62 is a first marker coordinate point. When the result of the determination in step S65 is positive, a process of step S66 is executed. On the other hand, when the result of the determination in step S65 is negative, i.e., the marker coordinate point which has already been specified in step S62 is a second marker coordinate point, a process of step S67 is executed.

In step S66, a second marker coordinate point is calculated using the assumed vector. The second marker coordinate point is calculated as a coordinate point indicating a position obtained by shifting the position of the first marker coordinate point (base point) in the direction of the assumed vector by the length of the assumed vector. Specifically, when the assumed vector is represented by (vx, vy) and the first marker coordinate point is represented by (m1x, m1y), the second marker coordinate point represented by (m2x, m2y) is calculated by the following expression.

$$m2x = m1x + vx$$

$$m2y = m1y + vy$$

Data indicating the second marker coordinate point calculated using the above-described expression is stored, as the second marker coordinate data 534b, into the main memory 13. Note that, in step S66, the CPU 10 updates the contents of the process result data 541 stored in the main memory 13 with contents indicating the third calculation process. After the end of step S66, the CPU 10 ends the third calculation process.

In step S67, a first marker coordinate is calculated using the assumed vector. The first marker coordinate point is calculated as a coordinate point indicating a position obtained by shifting the position of the second marker coordinate point (base point) in a direction opposite to the direction of the assumed vector by the length of the assumed vector. Specifically, when the assumed vector is represented by (vx, vy) and the second marker coordinate point is represented by (m2x, m2y), the first marker coordinate point represented by (m1x, m1y) is calculated using the following expression.

$$m1x = m2x - vx$$

$$m1y = m2y - vy$$

Data indicating the first marker coordinate point calculated using the above-described expression is stored as the first marker coordinate data 534a into the main memory 13. Note that, in step S67, the CPU 10 updates the contents of the process result data 541 stored in the main memory 13 with contents indicating the third calculation process. After the end of the step S67, the CPU 10 ends the third calculation process.

Note that, in other embodiments, after step S66 or S67, it is determined whether or not the marker coordinate point calculated in step S66 or S67 is present an area outside a captured image. When the marker coordinate point is present in the area outside the captured image, the marker coordinate point may be determined to be a correct marker coordinate point. When the marker coordinate point is present in an area inside the captured image, the marker coordinate point may not be determined to be correct, and the process of step S68 may be performed. In this manner, the assumption "the images of the markers 8a and 8b are inevitably captured when the controller 7 is present in the image capturing allowable range" can prevent an incorrect marker coordinate point from being calculated.

On the other hand, in step S68, it is determined that the calculation of a marker coordinate point by the third calculation process is not possible. In this embodiment, when the smallest value M3 of the current coordinate point-to-coordinate point distance is larger than or equal to the threshold value, it is determined that the calculation of a marker coordinate point is not possible. A reason why it is determined in this manner is that, when the smallest value M3 of the current coordinate point-to-coordinate point distance is larger than or equal to the threshold value, all detected coordinate points are distant from the previous marker coordinate points, and therefore, if a marker coordinate point is determined even in such a case, it is unlikely to obtain a correct marker coordinate point. In other words, in this embodiment, by performing the determination of step S61, an incorrect marker coordinate point is prevented from being calculated. After the end of step S68, the CPU 10 ends the third calculation process.

Referring back to FIG. 19, in step S15 following step S14, it is determined whether or not a marker coordinate point has been calculated in the third calculation process. Specifically, when a marker coordinate point has been calculated in steps S62, S66, and S67 of the third calculation process, the result of the determination in step S15 is positive. On the other hand, when it is determined in step S68 that the calculation of a marker coordinate point is not possible, the result of the determination in step S15 is negative. When the result of the determination in step S15 is positive, the CPU 10 ends the coordinate calculation process of FIG. 19. On the other hand, when the result of the determination in step S15 is negative, a process of step S25 described below is executed.

Next, a process performed when the result of the determination in step S11 is negative will be described. In this case, in step S16, it is determined whether or not a marker coordinate point has been calculated from a single detected coordinate point in the previous coordinate calculation process. Specifically, it is determined whether or not a marker coordinate point has been calculated by the third calculation process or the fourth calculation process in the previous coordinate calculation process. Note that the CPU 10 can determine which of the first to fourth calculation processes has been used to calculate a marker coordinate point(s) in the previous coordinate calculation process, by referencing the process result data 541 stored in the main memory 13. Note that, when the calculation of a marker coordinate point is not possible in the previous coordinate calculation process, the result of the determination in step S16 is negative. When the result of the determination in step S16 is positive, a process of step S17 is executed. On the other hand, when the result of the determination in step S16 is negative, a process of step S21 is executed.

Figure 25:
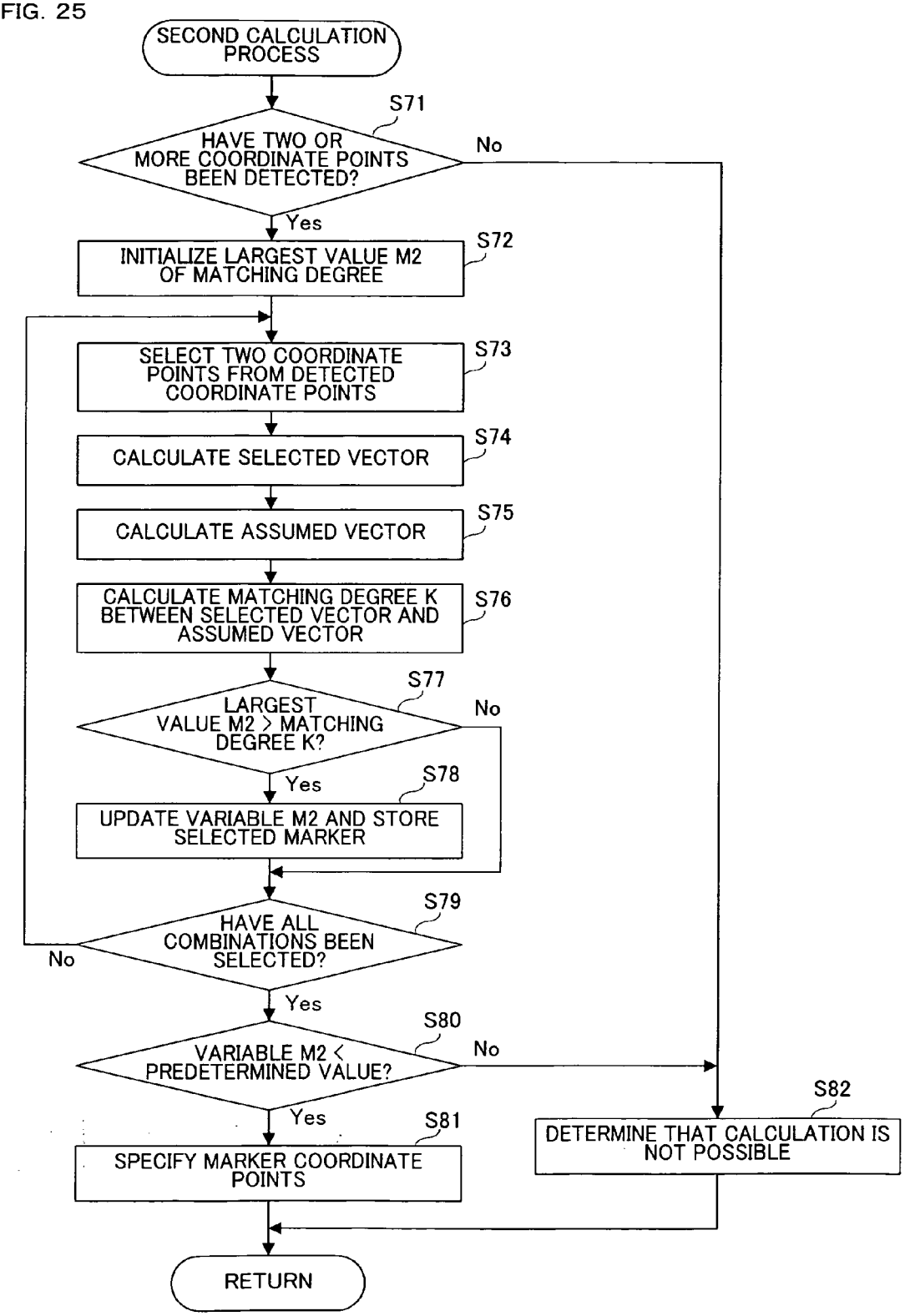
FIG. 25 is a flowchart illustrating details of a second calculation process in step S17 of FIG. 19.

In step S17, the second calculation process is executed. FIG. 25 is a flowchart illustrating details of the second calculation process in step S17 of FIG. 19. In the second calculation process, in step S71, it is determined whether or not the controller 7 has detected two or more coordinate points. The process of step S71 is similar to the process of step S31 in the first calculation process. When the result of the determination in step S71 is positive, a process of step S72 is executed. On the other hand, when the result of the determination in step S71 is negative, a process of step S82 is executed. In this case, a marker coordinate point is not calculated by the second calculation process. This is because the second calculation process is a process of calculating marker coordinate points using two or more detected coordinate points.

In step S72, a largest value M2 of the matching degree between the selected vector and the assumed vector is initialized. Specifically, the CPU 10 updates contents of the matching degree data 539 stored in the main memory 13 into data indicating a predetermined value. Note that this predetermined value is sufficiently small, and specifically, is smaller than a threshold value used in step S80 described below. The predetermined value and the threshold value used in the second calculation process are not related to the predetermined value and the threshold value used in the first and the third calculation processes. Following step S72, a process of step S73 is executed.

In step S73, the CPU 10 calculates two coordinate points from detected coordinate points. The process of step S73 is similar to the process of step S33 in the first calculation process. In the following step S74, a selected vector whose start point is a first selected coordinate point and whose end point is a second selected coordinate point is calculated in a manner similar to that of step S34 in the first calculation process. Further, in the following step S75, an assumed vector is calculated in a manner similar to that of step S63 in the third calculation process.

In the following step S76, a matching degree k between the direction of the selected vector and the direction of the assumed vector is calculated. In this embodiment, the matching degree k is obtained by normalizing the selected vector and the assumed vector into unit vectors having a length of 1, and calculating an inner product value of the normalized selected vector and the normalized assumed vector. Since the inner product value is increased with an increase in the degree of a match between the directions of the vectors, the matching degree k is set to become larger as the inner product value increases. Note that the matching degree k may be a similarity between the direction of the selected vector and the direction of the assumed vector, and in other embodiments, for example, may be an angle between the selected vector and the assumed vector. Note that, when the angle is used as the similarity, it is determined that the similarity is higher as the angle is decreased. Also, in the first calculation process, the angle may be used instead of the first difference degree v used in the step S36.

In the following step S77, it is determined whether or not the largest value M2 of the current matching degree is smaller than the matching degree k calculated in step S76. Note that the CPU 10 can find the largest value M2 of the current matching degree by referencing the matching degree data 539 stored in the main memory 13. When the result of the determination in step S77 is positive, a process of step S78 is executed. On the other hand, the result of the determination in step S77 is negative, the process of step S78 skipped and a process of step S79 is executed.

In step S78, the current selected coordinate point is set as a candidate coordinate point. Specifically, the CPU 10 updates the contents of the first candidate coordinate data 532a stored in the main memory 13 with the contents of the first selected coordinate data 531a stored in the main memory 13, and the contents of the second candidate coordinate data 532b stored in the main memory 13 with the contents of the second selected coordinate data 531b stored in the main memory 13. Also, the CPU 10 updates the contents of the matching degree data 539 stored in the main memory 13 with contents indicating the matching degree k calculated in step S76. By the process of step S78, a first selected coordinate point and a second selected coordinate point which constitute one of the vectors so far selected in a process loop of steps S73 to S79, that has a direction most similar to that of the assumed vector, are set as a first candidate coordinate point and a second candidate coordinate point. Following step S78, the process of step S79 is executed.

In step S79, concerning combinations of a first selected coordinate point and a second selected coordinate point selected from two or more detected coordinate points, it is determined whether or not all the combinations have been selected in step S73. The process of step S79 is similar to that of step S39 in the first calculation process. When the result of the determination in step S79 is positive, a process of step S80 is executed. On the other hand, the result of the determination in step S79 is negative, processes in and after step S73 are executed again for other combinations, and thereafter, the processes of step S73 to S79 are repeated until all the combinations are selected.

In step S80, it is determined whether or not the largest value M2 of the current matching degree is larger than a predetermined value. Specifically, the CPU 10 determines whether or not the largest value M2 indicated by the matching degree data 539 stored in the main memory 13 is larger than the threshold value. When the result of the determination in step S80 is positive, a process of step S81 is executed. On the other hand, when the result of the determination in step S80 is negative, a process of step S82 is executed.

In step S81, each currently set candidate coordinate point is determined as a marker coordinate point. The process of step S81 is similar to that of step S41 in the first calculation process. By step S81, each marker coordinate point is calculated in the second calculation process. Note that, in step S81, the CPU 10 updates the contents of the process result data 541 stored in the main memory 13 with contents indicating the second calculation process. After the end of step S80, the CPU 10 ends the second calculation process.

On the other hand, in step S82, it is determined that the calculation of marker coordinate points is not possible in the second calculation process. In this embodiment, when the largest value M2 of the matching degree is smaller than or equal to the above-described threshold value, it is determined that the calculation of marker coordinate points is not possible. A reason why it is determined in this manner is that, when the largest value M2 of the matching degree is smaller than or equal to the threshold value, it is considered that no selected vectors are similar to the assumed vector, and if marker coordinate points are determined even in such a case, correct marker coordinate points are unlikely to be obtained. In other words, in this embodiment, by performing the determination in step S80, an incorrect marker coordinate is prevented from being calculated. After the end of step S82, the CPU 10 ends the second calculation process.

Note that the assumed vector used in the second calculation process of this embodiment is a unit vector, but the length of the assumed vector may be used as in the third calculation process or the fourth calculation process described below.

Referring back to FIG. 19, in step S18 following step S17, it is determined whether or not marker coordinate points have been calculated in the second calculation process. Specifically, when marker coordinate points have been calculated in step S80 of the second calculation process, the result of the determination in step S18 is positive. On the other hand, when it is determined in step S81 that the calculation of marker coordinate points is not possible, the result of the determination in step S1 is negative. When the result of the determination in step S18 is positive, the CPU 10 ends the coordinate calculation process of FIG. 19. On the other hand, when the result of the determination in step S18 is negative, a process of step S19 is executed.

In step S19, the third calculation process is executed. Detailed contents of the third calculation process are similar to those of step S14. Specifically, since calculation of two marker coordinate points from two or more detected coordinate points fails, the third calculation process which can calculate two marker coordinate points from one or more detected coordinate points is executed. In the following step S20, it is determined whether or not a marker coordinate point has been calculated in the third calculation process. The determination process of step S20 is similar to that of step S15. When the result of the determination in step S20 is positive, the CPU 10 ends the coordinate calculation process of FIG. 19. On the other hand, when the result of the determination in step S20 is negative, a process of step S25 described below is executed.

Next, a process performed when the result of the determination in step S16 is negative will be described. In this case, in step S21, the second calculation process is executed. Detailed contents of the second calculation process are similar to those of step S17. In the following step S22, it is determined whether or not marker coordinate points have been calculated in the second calculation process. The determination process of step S22 is similar to that of step S15.

When the result of the determination in step S22 is positive, the CPU 10 ends the coordinate calculation process of FIG. 19. On the other hand, when the result of the determination in step S22 is negative, a process in step S23 is executed.

Figure 26:
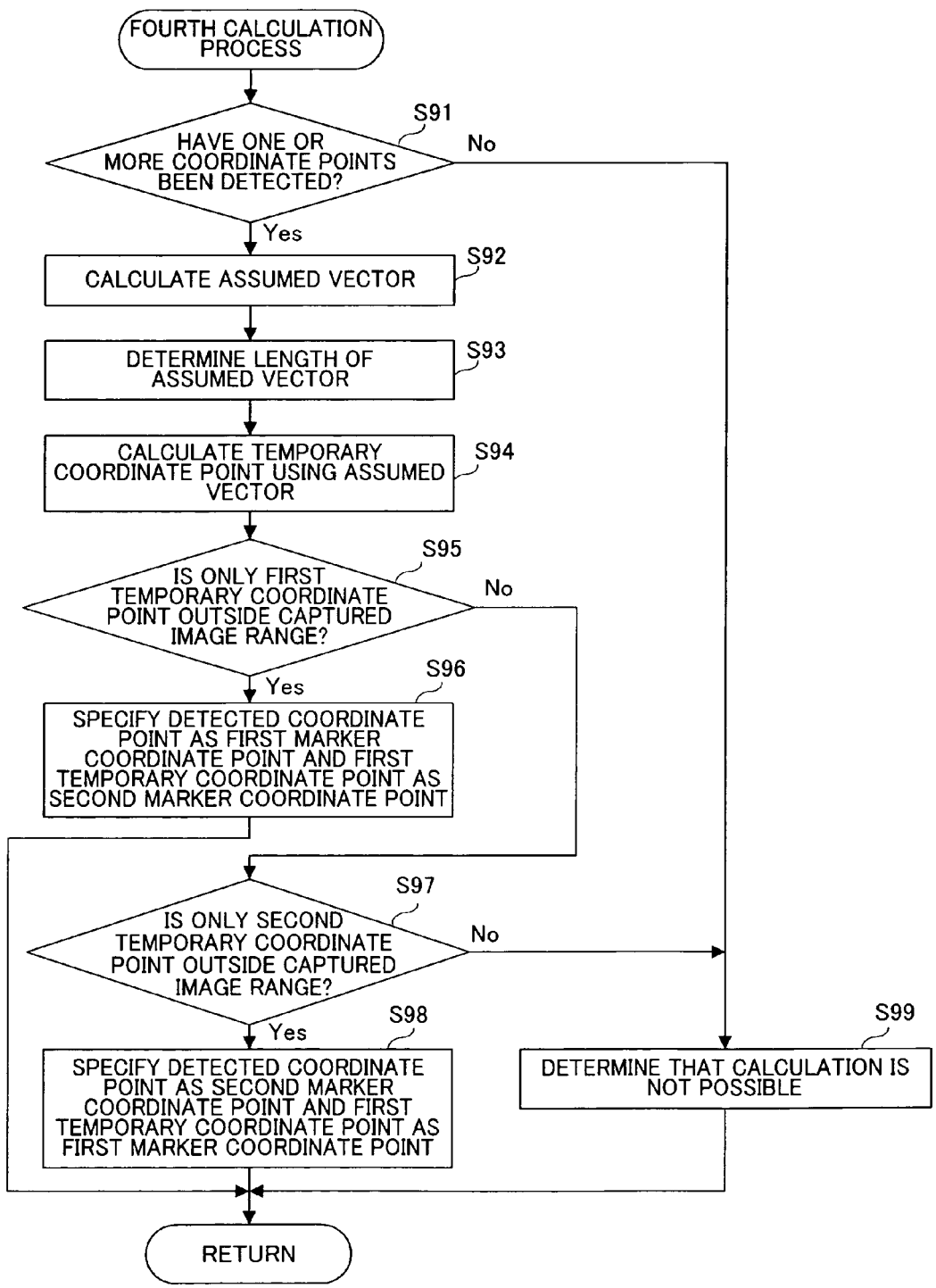
FIG. 26 is a flowchart illustrating details of a fourth calculation process in step S23 of FIG. 19.

In step S23, the fourth calculation process is executed. FIG. 26 is a flowchart illustrating details of the fourth calculation process in step S23 of FIG. 19. In the fourth calculation process, in step S91, it is determined whether or not one coordinate point has been detected by the controller 7. The determination of step S91 is performed, depending on whether or not the number of detected coordinate points is one, i.e., whether or not the detected coordinate data 521 included in the operation data 52 stored in the main memory 13 indicates one detected coordinate point. When the result of the determination in step S91 is positive, a process of step S92 is executed. On the other hand, when the result of the determination in step S91 is negative, a process in step S98 is executed. In this case, a marker coordinate is not calculated by the fourth calculation process. This is because the fourth calculation process is a process which can calculate a marker coordinate point when the number of detected coordinate points is only one. This is for the purpose of allowing a process of calculating a marker coordinate point from one detected coordinate point even when it is determined in steps S16 and S22 of FIG. 19 that the calculation of a coordinate point has not been performed at the previous time and two marker coordinate points have not been to be able to be calculated from two or more detected coordinate points.

In step S92, an assumed vector is calculated based on acceleration data. The process of step S92 is similar to that of step S63 in the third calculation process. In the following step S93, the length of the assumed vector is determined. In the fourth calculation process, as is different from step S64 in the third calculation process, the length of the assumed vector is determined based on a length between most recently calculated marker coordinate points. Note that, in this embodiment, when no marker coordinate points have been calculated, the contents of the marker coordinate data 534a and 534b stored in the main memory 13 are not updated and are maintained, and therefore, the most recently calculated marker coordinate points can be found by referencing the marker coordinate data 534a and 534b. The CPU 10 calculates the length between the most recently marker coordinate points based on the marker coordinate data 534a and 534b, and determines the length of the assumed vector as the calculated length. After determination of the length of the assumed vector, data indicating the assumed vector thus corrected is stored as the assumed vector data 537 into the main memory 13.

Note that, in step S93, a length between marker coordinate points may be estimated based on a size of an area corresponding to detected coordinate points, and the length of the assumed vector may be corrected into the estimated length, as in step S64. Alternatively, the CPU 10 may determine the assumed vector so that the assumed vector has a predetermined value.

In the following step S94, two temporary coordinate points are calculated using an assumed vector. Each temporary coordinate point is calculated based on a detected coordinate point and the assumed vector. Specifically, when the assumed vector is represented by (vx, vy) and the detected coordinate point is represented by (mx, my), a first temporary coordinate point represented by (p1x, p1y) and a second temporary coordinate point (p2x, p2y) are calculated using the following expression.

$$p1x = mx + vx$$

$$p1y = my + vy$$

$$p2x = mx - vx$$

$$p2y = my - vy$$

Data indicating the first temporary coordinate point calculated with the above-described expression is stored as the first temporary coordinate data 533a into the main memory 13, and data indicating the second temporary coordinate point calculated with the above-described expression is stored as the second temporary coordinate data 533b into the main memory 13.

In the following step S95, it is determined whether or not only the first temporary coordinate point is positioned outside an image capturing area range among temporary coordinate points calculated in step S94. In this embodiment, the image capturing area has a range of $0 \leq x \leq 1024$ and $0 \leq y \leq 768$. Therefore, when the first temporary coordinate point takes a value outside the range and the second temporary coordinate point takes a value outside the range, the result of the determination in step S95 is positive. When the result of the determination in step S95 is positive, a process of step S96 is executed. On the other hand, when the result of the determination in step S95 is negative, a process of step S97 is executed.

In step S96, the detected coordinate point is determined as a first marker coordinate point, and the first temporary coordinate point is determined as a second marker coordinate point. Specifically, the CPU 10 updates the contents of the first marker coordinate data 534a stored in the main memory 13 with the contents of the detected coordinate data 521 stored in the main memory 13, and the contents of the second marker coordinate data 534b stored in the main memory 13 with the contents of the first temporary coordinate data 533a stored in the main memory 13. Thereby, in the fourth calculation process, each marker coordinate point is calculated. Note that, in step S96, the CPU 10 updates the contents of the process result data 541 stored in the main memory 13 with contents indicating the fourth calculation process. After the end of step S96, the CPU 10 ends the fourth calculation process.

On the other hand, in step S97, it is determined whether or not only the second temporary coordinate is positioned outside the image capturing area range among the temporary coordinate points calculated in step S94. Specifically, the image capturing area has a range of $0 \leq x \leq 1024$ and $0 \leq y \leq 768$. Therefore, when the first temporary coordinate point takes a value outside the range and the second temporary coordinate point takes a value outside the range, the result of the determination in step S97 is positive. When the result of the determination in step S97 is positive, a process of step S98 is executed. On the other hand, when the result of the determination in step S97 is negative, a process of step S99 is executed.

In step S98, the second temporary coordinate is determined as a first marker coordinate point, and the detected coordinate point is determined as a second marker coordinate point. Specifically, the CPU 10 updates the contents of the first marker coordinate data 534a stored in the main memory 13 with contents of the second temporary coordinate data 533b stored in the main memory 13, and the contents of the second marker coordinate data 534b stored in the main memory 13 with the contents of the detected coordinate data 521 stored in the main memory 13. Thereby, each marker coordinate point is calculated in the fourth calculation process. Note that, in step S98, the CPU 10 updates the contents of the process result data 541 stored in the main memory 13 with contents indicating the fourth calculation process. After the end of step S98, the CPU 10 ends the fourth calculation process.

On the other hand, in step S99, it is determined that the calculation of a marker coordinate point is not possible in the fourth calculation process. Specifically, in this embodiment, when both the first and second temporary coordinate points are outside the image capturing area range, it is determined that the calculation of a marker coordinate is not possible. This is because, in this case, it cannot be determined which of the first and second temporary coordinate points is a correct marker coordinate point. Also, when both the first and second temporary coordinate points are within the image capturing area range, it is determined that the calculation of a marker coordinate point is not possible. This is because the fourth calculation process performs calculation, assuming that a marker coordinate point has not been detected, since the marker is outside the range. After the end of step S99, the CPU 10 ends the fourth calculation process.

Referring back to FIG. 19, in step S24 following step S23, it is determined whether or not a marker coordinate point has been calculated in the fourth calculation process. Specifically, when a marker coordinate point has been calculated in steps S96 and S98 of the fourth calculation process, the result of the determination in step S24 is positive. On the other hand, when it is determined in step S99 that the calculation of a marker coordinate point is not possible, the result of the determination in step S24 is negative. When the result of the determination in step S24 is positive, the CPU 10 ends the coordinate calculation process of FIG. 19. On the other hand, when the result of the determination in step S24 is negative, the process of step S25 is executed.

In step S25, it is determined that the calculation of marker coordinate points has failed. Note that the calculation of marker coordinate points is determined to fail in the following four cases, i.e., when the calculation of marker coordinate points is not possible in the first calculation process and the third calculation process, when the calculation of marker coordinate points is not possible in the second calculation process and the third calculation process, when the calculation of marker coordinate points is not possible in the second calculation process and the fourth calculation process, and when the number of detected coordinate points is zero. After the end of step S25, the CPU 10 ends the coordinate calculation process of FIG. 19.

Referring back to FIG. 18, following the coordinate calculation process of step S4, a process of step S5 is executed. Specifically, in step S5, a game process is executed based on each marker coordinate point calculated in step S4. For example, a process of moving a player's character appearing in a game space, depending on the positions of two marker coordinate points, is executed. Note that, when it is determined that the calculation of marker coordinate points has failed in step S25 of FIG. 19, a game process may be performed, assuming that no input has been made by the player, or a game process may be performed using the previously calculated marker coordinate points.

In the following step S6, a game image reflecting the result of the game process performed in step S5 is generated, and a game image is displayed on the monitor 2. In the following step S7, the CPU 10 determines whether or not to end the game. The determination of step S7 is performed, depending on, for example, whether or not the player clears the game, or when a time limit is set, whether or not the time limit has elapsed. When the result of the determination in step S7 is negative, the process of step S2 is executed again, and thereafter, a process loop of steps S2 to S7 is executed until it is determined to end the game. On the other hand, when the result of the determination in step S7 is positive, the CPU 10 ends the game process of FIG. 18. The game process has been heretofore described.

As described above, according to this embodiment, by the first or second calculation process, it is possible to calculate two marker coordinate points from detected coordinate points even when the number of detected coordinate points is three or more. In addition, by the third or fourth calculation process, it is possible to calculate two marker coordinate points even when the number of detected coordinate points is one.

Note that, in this embodiment, the first or second calculation process is firstly performed. When a marker coordinate point cannot be calculated by the first or second calculation process, the third or fourth calculation process is then performed. Since the first and second calculation processes are each a method of selecting marker coordinate points from detected coordinate points, the possibility of calculating correct marker coordinate points is considered to be higher than that of the third and fourth calculation processes. Therefore, by performing the first or second calculation process ahead of the third or fourth calculation process, the probability of calculating correct marker coordinate points can be increased. On the other hand, the third and fourth calculation processes can calculate a correct marker coordinate point even when the correct marker coordinate point has not been detected as a detected coordinate point. Therefore, by performing the third or fourth calculation process to calculate a marker coordinate point when calculation is not possible in the first or second calculation process, it is possible to reduce the probability that the calculation of a marker coordinate point is not possible.

Also, in the above-described embodiment, a detected coordinate point is assumed to be detected by the controller 7, and the game apparatus 3 is assumed to receive the detected coordinate point from the controller 7 and calculate a marker coordinate point. Here, in other embodiments, the game apparatus 3 may receive an image captured by image capturing means (image capturing element) from the controller 7, calculate a detected coordinate point from the captured image, and calculate a marker coordinate point from the detected coordinate point. Alternatively, the controller 7 may calculate a marker coordinate point from the detected coordinate point.

Also, in the above-described embodiment, the controller 7 comprises image capturing means, and the markers 8*a* and 8*b* whose images are to be captured are provided separately from the controller 7. Here, in other embodiments, the controller 7 may comprise the markers 8*a* and 8*b*, and the image capturing means may be provided separately from the controller 7 (e.g., on the monitor 2). In such an embodiment, an image of an object whose image is to be captured can be captured by the image capturing means, and by connecting the image capturing means and the game apparatus 3, the game apparatus 3 can obtain the captured image.

Further, in other embodiments, in the first calculation process, a vector connecting marker coordinate points most recently stored into the main memory 13 may be used instead of the previous vector connecting the previous marker coordinate points. When the most recently stored marker coordinate point is excessively old, i.e., the most recently stored marker coordinate point is stored earlier by more than a predetermined number of frames, the above-described vector may not be used. Note that, in this case, it is determined that the calculation of a marker coordinate point is not possible in the first calculation process.

Further, in other embodiments, the above-described previous vector may be used instead of the assumed vector used in the third and fourth calculation processes. Thereby, tilt determining means, including an acceleration sensor or the like, is no longer required, thereby making it possible to simplify the structure of the apparatus.

Also, in the above-described embodiment, two marker coordinate points are distinguished into a first marker coordinate and a second marker coordinate, but the two marker coordinate points may not be distinguished from each other. In this case, in the processes of steps S39 and S79, order does not matter in a combination of two detected coordinate points. Specifically, a combination of a certain coordinate A as one selected coordinate point and a certain coordinate point B as the other selected coordinate point is considered to be identical to a combination of the coordinate point B as one selected coordinate point and the coordinate A as the other selected coordinate point. Note that a situation that the upper surface of the controller 7 faces upward is not distinguished from a situation that the upper surface of the controller 7 faced downward, but when it is not assumed that the upper surface of the controller 7 face downward in its use, two marker coordinate points may not be distinguished from each other without a problem.

As described above, the present invention can be used in, for example, a game system for the purpose of, for example, increasing an operation allowable range to reduce the possibility that an operation is not possible.

While the invention has been described in detail, the foregoing description is in all aspects illustrative and not restrictive. It is understood that numerous other modifications and variations can be devised without departing from the scope of the invention.

What is claimed is:

1. A coordinate calculating apparatus for calculating two object position coordinate points from an image captured by an image capturing apparatus, the two object position coordinate points indicating positions of two predetermined objects whose images are captured, such positions being indicated on a plane corresponding to a plane of the captured image, the apparatus comprising:

coordinate detecting programmed logic circuitry configured to detect a position coordinate point for each area satisfying a predetermined condition in the captured image;

vector setting programmed logic circuitry configured to set a vector indicating a relative positional relationship between two position coordinate points in the captured image; and coordinate determining programmed logic circuitry configured to determine one of the detected position coordinate points detected by the coordinate detecting programmed logic circuitry as one of the object position coordinate points, and determining the other object position coordinate point using the one of the detected position coordinate points and the vector.

2. The coordinate calculating apparatus according to claim 1, wherein the vector setting programmed logic circuitry includes:

direction setting programmed logic circuitry configured to set a direction of the vector based on a tilt determined by a tilt determining means for determining a tilt of the image capturing apparatus; and length setting programmed logic circuitry configured to set a length of the vector to be a predetermined length.

3. The coordinate calculating apparatus according to claim 2, further comprising:
object position storing means of storing object position coordinate data indicating at least one of a set of the two object position coordinate points determined by the coordinate determining programmed logic circuitry, and a vector connecting the two object position coordinate points, every time a determination is performed by the coordinate determining programmed logic circuitry,
wherein the length setting programmed logic circuitry sets the length of the vector to be a length connecting between the two object position coordinate points indicated by object position coordinate data most recently stored.

4. The coordinate calculating apparatus according to claim 2, wherein the direction setting programmed logic circuitry sets the direction of the vector based on a correspondence relationship between a tilt determined by the tilt determining means in a situation that the image capturing, apparatus is at a predetermined tilt, and a direction connecting the two object position coordinate points detected from an image captured by the image capturing apparatus in the situation.

5. The coordinate calculating apparatus according to claim 1, wherein the tilt determining means includes an acceleration sensor which is fixedly provided to a housing used in common with the image capturing apparatus and detects accelerations in two axial directions perpendicular to an image capturing direction of the image capturing apparatus, and
the vector setting programmed logic circuitry calculates the vector based on the acceleration in the axial directions detected by the acceleration sensor.

6. The coordinate calculating apparatus according to claim 1, further comprising:
object position storing means of storing object position coordinate data indicating at least one of a set of the two object position coordinate points determined by the coordinate determining programmed logic circuitry, and a vector connecting the two object position coordinate points, every time a determination is performed by the coordinate determining means,
wherein the vector setting programmed logic circuitry calculates or obtains a vector connecting between the two object position coordinate points indicated by object position coordinate data most recently stored.

7. The coordinate calculating apparatus according to claim 1, wherein the coordinate determining programmed logic circuitry includes:
first determination means of determining which of a first object position coordinate point and a second object position coordinate point of the two object position coordinate points one of the position coordinate points detected by the coordinate detecting means is; and
second determination means of determining the second object position coordinate point by adding the vector to the first object position coordinate point when the first object position coordinate point is determined by the first determination means, and the first object position coordinate point by subtracting the vector from the second object position coordinate point when the second object position coordinate point is determined by the first determination means.

8. The coordinate calculating apparatus according to claim 7, further comprising:
object position storing means of storing object position coordinate data including the two object position coordinate points determined by the coordinate determining means, every time determination is performed by the coordinate determining programmed logic circuitry;
wherein the first determination means calculates a distance between each of the position coordinate points detected by the coordinate detecting programmed logic circuitry and each of a first object position coordinate point and a second object position coordinate point indicated by object position coordinate data most recently stored, and determines one of the position coordinate points detected by the coordinate detecting programmed logic circuitry, as a first object position coordinate point, when a distance between the one detected position coordinate point and the first object position coordinate point indicated by the object position coordinate data most recently stored is shortest, and one of the position coordinate points detected by the coordinate detecting programmed logic circuitry, as a second object position coordinate point, when a distance between the one detected position coordinate point and the second object position coordinate point indicated by the object position coordinate data most recently stored is shortest.

9. The coordinate calculating apparatus according to claim 1, wherein the coordinate determining programmed logic circuitry includes:
temporary coordinate calculating means of determining one of the position coordinate points detected by the coordinate detecting programmed logic circuitry, as a determined coordinate point, adding the vector to the determined coordinate point to obtain a first temporary coordinate point, and subtracting the vector from the determined coordinate point to obtain a second temporary coordinate point; and
determination executing means of determining the first temporary coordinate point and the determined coordinate point as the two object position coordinate points when only the first temporary coordinate point of the two temporary coordinate points is outside an area of a captured image, and the second temporary coordinate point and the determined coordinate point as the two object position coordinate points when only the second temporary coordinate point of the two temporary coordinate points is outside an area of a captured image.

10. The coordinate calculating apparatus according to claim 1, further comprising:
object position coordinate calculating means of, when the number of position coordinate points detected by the coordinate detecting programmed logic circuitry is two or more, calculating the two object position coordinate points using the position coordinate points,
wherein the coordinate determining programmed logic circuitry determines the two object position coordinate points when calculation of the two object position coordinate points by the object position coordinate calculating means is not possible.

11. A coordinate calculating apparatus for calculating two object position coordinate points from an image captured by an image capturing apparatus, the two object position coordinate points indicating positions of two predetermined objects whose images are captured, such positions being indicated on a plane corresponding to a plane of the captured image, the apparatus comprising:
coordinate detecting means of detecting a position coordinate point of an area satisfying a predetermined condition in the captured image for each area;
reference setting means of setting a reference with respect to at least one of a direction connecting two position coordinate points in the captured image and a length between the two position coordinate points, when a plurality of position coordinate points is detected by the coordinate detecting means;

selection means of selecting a combination of two position coordinate points most close to the reference set by the reference setting means, from combinations of two position coordinate points among the plurality of position coordinate points;

determination means of determining whether or not two position coordinate points have been selected by the selection means;

output means of outputting the two position coordinate points selected by the selection means, as the two object position coordinate points, when a result of the determination by the determination means is positive;

vector setting means of setting a vector indicating a relative positional relationship between two position coordinate points in the captured image, when the result of the determination by the determination means is negative; and coordinate determining means of determining one of the position coordinate points determined by the coordinate determining means as one of the object position coordinate points, and determining the other object position coordinate point using the one of the detected position coordinate points and the vector, when the result of the determination by the determination means is negative.

12. A computer readable non-transitory tangible computer readable storing medium storing a program which is executed by a computer for computing two object position coordinate points in an image captured by an image capturing apparatus, the two object position coordinate points indicating positions of two predetermined objects whose images are captured, such positions being indicated on a plane corresponding to a plane of the captured image, the program causing the computer to perform operations comprising:

setting a vector indicating a relative positional relationship between two position coordinate points in the captured image; and a coordinate determining step of selecting one object position coordinate point from position coordinate points corresponding to an area satisfying a predetermined condition in the captured image and determining the other object position coordinate point using the selected one position coordinate point and the vector.

13. The non-transitory tangible computer readable storing medium according to claim 12, wherein the operation of setting a vector indicating a relative positional relationship between two position coordinate points in the captured image includes:

setting a direction of the vector based on a tilt of the image capturing apparatus with respect to gravity; and setting a length of the vector based on the two object position coordinate points.

14. The non-transitory tangible computer readable storing medium according to claim 13, wherein the program causes the computer to perform further operations comprising:

storing object position coordinate data indicating at least one of a set of the two object position coordinate points and storing data describing a vector connecting the two object position coordinate points, and wherein the length of the vector is set based on distance between the two object position coordinate points indicated by object position coordinate data most recently stored.

15. The non-transitory tangible computer readable storing medium according to claim 13, wherein a direction of the vector is set based on a correspondence relationship between a determined tilt whenever the image capturing apparatus is at a predetermined tilt and a direction connecting the two object position coordinate points is determined from an image captured by the image capturing apparatus.

16. The non-transitory tangible computer readable storing medium according to claim 13, wherein the tilt determining means includes an acceleration sensor which is fixedly provided to a housing used in common with the image capturing apparatus and detects accelerations in two axial directions perpendicular to an image capturing direction of the image capturing apparatus, and the computer calculates the vector based on the acceleration in the axial directions detected by the acceleration sensor.

17. The non-transitory tangible computer readable storing medium according to claim 12, wherein the program causes the computer to further execute:

an object position storing step of storing object position coordinate data indicating at least one of a set of the two object position coordinate points determined by the coordinate determining step, and a vector connecting the two object position coordinate points, every time determination is performed by the coordinate determining step, wherein the computer calculates or obtains a vector connecting between the two object position coordinate points indicated by object position coordinate data most recently stored.

18. The non-transitory tangible computer readable storing medium according to claim 12, wherein the coordinate determining step includes:

a first determination step of determining which of a first object position coordinate point and a second object position coordinate point of two object position coordinate points are the selected one of the position coordinate points; and a second determination step of determining the second object position coordinate point by adding the vector to the first object position coordinate point when the first object position coordinate point is determined by the first determination step, and determining the first object position coordinate point by subtracting the vector from the second object position coordinate point when the second object position coordinate point is determined by the first determination step.

19. The non-transitory tangible computer readable storing medium according to claim 18, wherein the program causes the computer to further execute:

an object position storing step of storing object position coordinate data including the two object position coordinate points determined by the coordinate determining step, into a memory of the coordinate calculating apparatus, every time determination is performed in the coordinate determining step, wherein the first determination step calculates a distance between each of the position coordinate points and each of a first object position coordinate point and a second object position coordinate point indicated by object position coordinate data most recently stored, and determines one of the detected position coordinate points, as a first object position coordinate point, when a distance between the one detected position coordinate point and the first object position coordinate point indicated by the object position coordinate data most recently stored is shortest, and one of the detected position coordinate points, as a second object position coordinate point, when a distance between the one detected position coordinate point and the second object position coordinate point indicated by the object position coordinate data most recently stored is shortest.

20. The non-transitory tangible computer readable storing medium according to claim 12, wherein the coordinate determining step includes:

a temporary coordinate calculating step of determining one of the detected position coordinate points, as a determined coordinate point, adding the vector to the determined coordinate point to obtain a first temporary coordinate point, and subtracting the vector from the determined coordinate point to obtain a second temporary coordinate point; and a determination executing step of determining the first temporary coordinate point and the determined coordinate point as the two object position coordinate points when only the first temporary coordinate point of the two temporary coordinate points is outside an area of a captured image, and the second temporary coordinate point and the determined coordinate point as the two object position coordinate points when only the second temporary coordinate point of the two temporary coordinate points is outside an area of a captured image.

21. The non-transitory tangible computer readable storing medium according to claim 12, wherein the program causes the computer to further execute:

an object position coordinate calculating step of, when the number of position coordinate points detected by the coordinate detecting means is two or more, calculating the two object position coordinate points using the position coordinate points, wherein the coordinate determining step is executed when calculation of the two object position coordinate points is not possible in the object position coordinate calculating step.

22. A non-transitory tangible computer readable storing medium storing a program which is executed by a computer computing two object position coordinate points from an image captured by an image capturing apparatus, the two object position coordinate points indicating positions of two predetermined objects whose images are captured, such positions being indicated on a plane corresponding to a plane of an image sensor on which the image is captured, the program causing the computer to perform operations comprising:

setting a reference with respect to at least one of a direction connecting two position coordinate points in the captured image and a length between the two position coordinate points;

identifying position coordinate points corresponding to one or more areas within the captured area which satisfy a predetermined condition and selecting a combination of two position coordinate points that are closest to the set reference, a selection being made from combinations of two position coordinate points among position coordinate points corresponding to one or more areas within the captured area which satisfy a predetermined condition;

determining whether a combination of two position coordinate points that are closest to the reference set can be identified;

outputting the two selected position coordinate points if it is determined that said combination of two position coordinate points can be identified; and if it is determined that said combination of two position coordinate points can not be identified, setting a vector indicating a relative positional relationship between two position coordinate points in the captured image, and then selecting one of said position coordinate points from at least one of said areas satisfying said predetermined condition in the captured image and designating it as one of the object position coordinate points, and then determining the other object position coordinate point using the one position coordinate point and the set vector.

* * * * *